US007636751B2

(12) United States Patent
Weaver et al.

(10) Patent No.: US 7,636,751 B2
(45) Date of Patent: *Dec. 22, 2009

(54) MULTIPLE PERSONALITIES

(75) Inventors: Andrew Weaver, Herndon, VA (US);
Eric Jeffrey Wolf, Alexandria, VA (US);
Julie McCool, Reston, VA (US); Julie Mills, Reston, VA (US); Brian Heikes, Ashburn, VA (US)

(73) Assignee: AOL LLC, Dulles, VA (US)

( * ) Notice: Subject to any disclaimer, the term of this patent is extended or adjusted under 35 U.S.C. 154(b) by 900 days.

This patent is subject to a terminal disclaimer.

(21) Appl. No.: 10/715,209

(22) Filed: Nov. 18, 2003

(65) Prior Publication Data

US 2004/0148346 A1     Jul. 29, 2004

Related U.S. Application Data

(60) Provisional application No. 60/427,941, filed on Nov. 21, 2002, provisional application No. 60/464,106, filed on Apr. 21, 2003, provisional application No. 60/488,399, filed on Jul. 21, 2003.

(51) Int. Cl.
*G06F 15/16* (2006.01)
(52) U.S. Cl. .................................. 709/204; 709/205
(58) Field of Classification Search .................. None
See application file for complete search history.

(56) References Cited

U.S. PATENT DOCUMENTS

| | | | |
|---|---|---|---|
| 5,659,692 A | 8/1997 | Poggio et al. | |
| 5,745,556 A | 4/1998 | Ronen | |
| 5,793,365 A | 8/1998 | Tang et al. | |
| 5,872,521 A | 2/1999 | Lopatukin et al. | |
| 5,880,731 A | 3/1999 | Liles et al. | |
| 5,894,305 A | 4/1999 | Needham | |
| 5,944,780 A | 8/1999 | Chase et al. | |
| 5,963,217 A | 10/1999 | Grayson et al. | |
| 6,014,135 A * | 1/2000 | Fernandes | 715/744 |
| 6,192,396 B1 | 2/2001 | Kohler | |
| 6,248,946 B1 | 6/2001 | Dwek | |
| 6,252,588 B1 * | 6/2001 | Dawson | 715/752 |
| 6,252,952 B1 | 6/2001 | Kung et al. | |
| 6,301,609 B1 | 10/2001 | Aravamudan et al. | |
| 6,324,569 B1 | 11/2001 | Ogilvie et al. | |

(Continued)

OTHER PUBLICATIONS

David Kurlander et al., "International Conference on Computer Graphics and Interactive Techniques—Proceedings of the 23$^{rd}$ annual conference on Computer graphics and interactie techniques," *Comic Chat*, printed from http://portal.acm.org/citation.cfm?id=237260&coll=portal&d1=portal&CFID=3718856&CF . . . on Aug. 9, 2002, pp. 225-236.

(Continued)

*Primary Examiner*—John B. Walsh
(74) *Attorney, Agent, or Firm*—Fish & Richardson P.C.

(57) ABSTRACT

A computer implemented method enables perception of multiple online personas in an instant messaging communications session by identifying at least two identities within a communications environment to whom messages may be directed, and by enabling a first persona of a user to be projected to a first of the identities while concurrently enabling a second persona of the same user to be projected to a second of the identities.

56 Claims, 17 Drawing Sheets

U.S. PATENT DOCUMENTS

| | | | |
|---|---|---|---|
| 6,346,952 | B1 | 2/2002 | Shtivelman |
| 6,373,817 | B1 | 4/2002 | Kung et al. |
| 6,389,028 | B1 | 5/2002 | Bondarenko et al. |
| 6,430,604 | B1 | 8/2002 | Ogle et al. |
| 6,434,599 | B1 | 8/2002 | Porter |
| 6,453,294 | B1 | 9/2002 | Dutta et al. |
| 6,487,584 | B1 | 11/2002 | Bunney |
| 6,671,682 | B1 | 12/2003 | Nolte et al. |
| 6,781,608 | B1 * | 8/2004 | Crawford ............... 715/758 |
| 6,976,092 | B1 * | 12/2005 | Daniell et al. ............ 709/246 |
| 6,981,223 | B2 * | 12/2005 | Becker et al. ............ 715/753 |
| 7,035,803 | B1 * | 4/2006 | Ostermann et al. ......... 704/260 |
| 7,181,441 | B2 * | 2/2007 | Mandato et al. ............ 707/3 |
| 7,275,215 | B2 * | 9/2007 | Werndorfer et al. ........ 715/752 |
| 2001/0030664 | A1 | 10/2001 | Shulman et al. |
| 2002/0059425 | A1 | 5/2002 | Belfiore et al. |
| 2002/0078150 | A1 | 6/2002 | Thompson et al. |
| 2002/0078153 | A1 | 6/2002 | Chung et al. |
| 2002/0113820 | A1 | 8/2002 | Robinson et al. |
| 2002/0119789 | A1 | 8/2002 | Friedman |
| 2004/0128353 | A1 | 7/2004 | Goodman et al. |
| 2005/0080868 | A1 | 4/2005 | Malik |

OTHER PUBLICATIONS

Cerulean Studios, Trillian Help Center, Chapter 4, Section 1, printed from http://www.trillian.cc/help/sec-1.php?hchap=4&hsub=1 on Nov. 12, 2002, pp. 1-2.

Cerulean Studios, Trillian Help Center, Tutorials, Chapter 10, Section 5, printed from http://www.trillian.cc/help/sec-1.php?hchap=10&hsub=5 on Nov. 12, 2002, p. 1.

Cerulean Studios, Trillian Help Center, Tutorials, Chapter 10, Section 7, printed from http://www.trillian.cc/help/sec-1.php?hchap=10&hsub=7 on Nov. 12, 2002, pp. 1-2.

Pamela Parker, "Oct. 22, 2001—New Yahoo! Messenger Incorporates Viral Marketing", printed from http://siliconvalley.internet.com/news/article.php/908221 on Oct. 30, 2002, pp. 1-3.

InternetNews.com Staff, Apr. 17, 2002—IAR Bits and Bytes, "Yahoo! Debuts Purina IM Skin, Eagles Tour Promo," printed from http://www.intrnetnews.com/IAR/article.php/1011751 on Oct. 30, 2002, pp. 1-3.

Yahoo! Messenger, Yahoo! Help—IMVironments, printed from http://help.yahoo.com/help/us/mesg/imv/index.html on Oct. 30, 2002, p. 1.

Yahoo! Messenger, Yahoo! Help—IMVironments, printed from http://help.yahoo.com/help/us/mesg/imv/imv-04.html on Oct. 30, 2002, p. 1.

Yahoo! Messenger, Yahoo! Help—IMVironments, printed from http://help.yahoo.com/help/us/mesg/imv/imv-01.html on Oct. 30, 2002, p. 1.

Making your own Yahoo! Messenger IMVironments, printed from http://www.xcflabs.com/~yaroslav/imvironments/instructions.html on Oct. 30, 2002, pp. 1-2.

Bob Woods, Instant Messaging Planet: Public IM: IM—The Cat's Meow, printed from http://www.instantmessagingplanet.com/public/article/0,,10817_1011011,00.html. on Oct. 30, 2002, pp. 1-3.

Roy Santos, Tech TV/Review: Yahoo! Messenger 5.0, printed from http://www.techtv.com/products/print/0,23102,3351041,00.html on Oct. 30, 2002, pp. 1-2.

Rebecca Viksnins, First Look: Yahoo Messenger 5.0—Software Reviews—CNET.com, printed from http://www.cnet.com/software/0-5566362-8-7787365-1.html on Oct. 30, 2002, pp. 1-2.

ZDNet: Yahoo Messenger 5.0 Review, printed from http://www.zdnet.com/supercenter/stories/review/0,12070,538313,00.html on Oct. 30, 2002, pp. 1-3.

ZDNet: Yahoo Messenger 5.0 Overview, printed from http://www.zdnet.com/supercenter/stories/overview/0,12069,538313,00.html on Oct. 30, 2002, pp. 1-3.

Screenshot demonstration of Yahoo Messenger Help—IMVironments, Nov. 12, 2002, p. 1.

Screenshot Menu, Yahoo! Messenger Preferences, Nov. 12, 2002, p. 1.

Screenshot demonstration, karl_renner2002—Instant Message, Nov. 12, 2002, p. 1.

Yahoo: Messenger—IMVironments™, printed from http://messenger.yahoo.com/messenger/imv/index.html on Nov. 12, 2002, pp. 1-2.

Yahoo! Help—IMVironments, "How do I send an IMVironment to a friend?", printed from http://help.yahoo.com/help/us/mesg/imv/imv-04.html on Nov. 12, 2002, p. 1.

Yahoo!Messenger, Instantly communicate with all of your online friends . . . , printed from http://messenger.yahoo.com/ on May 24, 2002, p. 1.

Yahoo!Messenger—IMVironments™, List of Available IMVironments, printed from http://messenger.yahoo.com/messenger/imv/ on May 24, 2002, pp. 1-2.

Screenshot, nikebball87: AIM—nikebball87, printed from http://www.trillian.cc/skins/windowsxp.gif on May 14, 2002, p. 1.

Screenshot, Trillian 7 Skin: GoneBlue v.01, printed from http://www.trillian.cc/skins/goneblue.jpg on May 14, 2002, p. 1.

Screenshot, Dream Green, printed from http://www.trillian.cc/skins/DreamGreen.jpg on May 14, 2002, p. 1.

Screenshot, Trillian chosenOS, printed from http://www.trillian.cc/skins/chosen_trill.jpg on May 14, 2002, p. 1.

Netscape 7.0, Preview Release 1, Reviewer's Guide, May 17, 2002, chapter 2, "Internet Messaging," pp. 9-10 and "Instant Messaging with AIM (AOL Instant Messengers$^{SM}$ )," pp. 16-18.

iPlanet Instant Messenger Release 3.0 Quick Reference, Oct. 2001, pp. 1-5.

* cited by examiner

| FIG. 12A |
|---|
| FIG. 12B |
| FIG. 12C |

FIG. 12

MULTIPLE PERSONALITIES

This application claims priority from U.S. Provisional Application No. 60/427,941, filed Nov. 21, 2002, U.S. Provisional Application No. 60/464,106, filed Apr. 21, 2003, and U.S. Provisional Application No. 60/488,399, filed Jul. 21, 2003, all of which are incorporated by reference.

TECHNICAL FIELD

This description relates to projecting multiple personalities in communications for a communications application operator (hereinafter "sender") and/or changing features and functionality based on the selected personality.

BACKGROUND

Online service providers facilitate access to information and services by providing interactive User Interfaces (UIs) that help users navigate to desired resources. For example, in the case of a system that enables the exchange of instant messages (IMs), a UI allows an IM sender to invoke actions, such as establishing a communications link, through the selection of screen objects such as icons, windows, and drop-down menus. The design of a UI has a significant impact on an IM sender's online experience. In particular, the icons, the windows, and the menus of a UI may be arranged to enable an IM sender to locate information and services quickly and easily.

An IM sender may send self-expression items to an IM recipient. Current implementations of self-expression in instant messaging enable a user to individually select self-expression settings, such as a Buddy Icon and Buddy Wallpaper, which settings thereafter project to everyone who sees or interacts with that person online.

SUMMARY

A user may name and save multiple different "personas" or "personalities," which are groups of instant messaging self-expression settings such as, for example, Buddy Icons, Buddy Sounds, Buddy Wallpaper and Emoticons (e.g., Smileys). Then, depending on the identity with whom the user communicates, they may quickly access and adopt one of their personalities in at least an instant messaging environment, and may manage the online appearance they present to others. Functionality and features of the instant messaging interface may differ based upon the personality being used in the IM conversation.

In one general aspect, a computer implemented method for enabling perception of multiple online personas in an instant messaging communications session includes identifying at least two identities within a communications environment to whom messages may be directed, and enabling a first persona of a user to be projected to a first of the identities while concurrently enabling a second persona of the same user to be projected to a second of the identities.

Implementations may include one or more of the following features. For example, the first persona may be associated with a first group of identities so that the first persona is projected to members of the first group of identities in a communications session, where the first of the identities is included within the first group of identities. Also, second persona may be associated with a second group of identities so that the second persona is projected to members of the second group of identities in a communications session, where the second of the identities is included within the second group of identities.

A persona may be associated with the first of the identities and a different persona may be associated with a group of the identities with which the first of the identities is associated. The first persona projected to the first of the identities includes an amalgamation of the persona associated with the first of the identities and the different persona associated with the group of the identities. The persona associated with the first of the identities may override the different persona associated with the group of the identities to the extent a conflict exists.

A global persona may be associated with each of the identities and a different persona may be associated with a group of the identities with which the first of the identities is associated. The first persona projected to the first of the identities includes an amalgamation of the global persona associated with each of the identities and the different persona associated with the group of the identities. The global persona associated with each of the identities may be overridden by the different persona associated with the group of the identities to the extent a conflict exists.

A global persona may be associated with each of the identities and a different persona may be associated with the first of the identities. The first persona projected to the first of the identities includes an amalgamation of the global persona associated with each of the identities and the different persona associated with the first of the identities. The global persona associated with each of the identities may be overridden by the different persona associated with the first of the identities to the extent a conflict exists.

An individual persona may be associated with the first of the identities, a group persona may be associated with a group of the identities with which the first of the identities is associated, and a global persona may be associated with each of the identities. The first persona projected to the first of the identities includes an amalgamation of the individual persona associated with the first of the identities, the group persona associated with the group of the identities, and the global persona associated with each of the identities. The individual persona associated with the first of the identities overrides the group persona associated with the group of the identities and the group persona associated with the group of the identities overrides the global persona associated with each of the identities, to the extent a conflict exists.

The communications session includes an instant messaging communications session, and the identities may be members of a buddy list including the online presence state of the identities.

The first persona of the user may be projected to the first of the identities while concurrently projecting the second persona of the same user to the second of the identities. A selection may be made among the first and second personas for projection to a particular one of the identities based on an attribute of the particular identity. A selection of at least the first and second personas may be received from the user. The first persona may be selected based upon an attribute of the first identity.

The persona assigned to the first identity may be configured to change based upon the occurrence of a predetermined event. The predetermined event may be, for example, a time of day, a day of the week, the passage of a pre-determined interval of time, a weather condition at a predetermined geographic location, communication of a predetermined word, communication of a predetermined emoticon, communication of a predetermined date, and communication of a predetermined number of instant messages from the first identity.

Also, the persona assigned to the first identity may be configured to change at random among more than one selected personas.

The user may be a potential instant messaging sender, the first identity may be a first potential instant messaging recipient, and the first persona may be rendered to the first potential instant messaging recipient before communications are initiated by the potential instant messaging sender.

The user may be a potential instant messaging sender, the first identity may be a first potential instant messaging recipient, and the first persona may be rendered to the first potential instant messaging recipient after communications are initiated by the potential instant messaging sender.

In another general aspect, a computer implemented method for enabling perception of multiple online personas in an instant messaging communications session includes rendering, on an instant messaging recipient system, an instant messaging application user interface for an instant messaging communications session involving at least one potential instant messaging recipient and a single potential instant messaging sender, receiving a message that includes a text message and a persona to be displayed by the potential instant messaging recipient when perceiving the text message, the persona being selected by the instant messaging sender system from among multiple pre-defined personas for the single potential instant messaging sender, each persona including a collection of one or more self-expression items, and rendering the selected persona at the potential instant messaging recipient system when rendering another portion of the message.

Implementations may include one or more of the following features. For example, the selected persona may be rendered before communications are initiated by the potential instant messaging sender or the selected persona may be rendered after communications are initiated by the potential instant messaging sender. Self-expression items include one or more of a buddy icon, a wallpaper, an emoticon, and a sound.

One or more personas may be defined. A first persona may be assigned to a first potential instant messaging recipient so that the first persona is thereafter automatically invoked and projected, in an instant messaging communications session involving the first potential instant messaging recipient. A second persona may be assigned to a second potential instant messaging recipient so that the second persona is thereafter automatically invoked and projected, in an instant messaging communications session involving the second potential instant messaging recipient, where the second persona is at least partially distinguishable from the first persona. A first persona may be assigned to a first group of potential instant messaging recipients so that the first persona is thereafter automatically invoked and projected in an instant messaging communications session involving a member of the first group of potential instant messaging recipients, and a second persona may be assigned to a second potential instant messaging recipient so that the second persona is thereafter automatically invoked and projected, in an instant messaging communications session involving the second potential instant messaging recipient, where the second persona is at least partially distinguishable from the first persona.

A persona may be selected for use in an instant messaging communications session with a potential instant messaging recipient according to a hierarchy of selection. The hierarchy of selection may include first selecting a persona assigned to the potential instant messaging recipient if available, next selecting a persona assigned to a group containing the potential instant messaging recipient, if available, and next selecting a default persona, if available. Selecting the persona according to a hierarch of selection may include appending one or more self-expression items of a higher-ranked persona to self-expression items of a lower-ranked persona, or may include replacing one or more self-expression items of a lower-ranked persona with self-expression items of a higher-ranked persona.

A personality may be locked to a potential instant messaging recipient so as to guard against unintended personality switching, or a personality may be forbidden to be assigned to a potential instant messaging recipient so as to guard against unintended personality switching.

The personality may be changed by assigned a potential instant messaging recipient while conversing with the potential instant messaging recipient in an instant messaging communications session. A persona may be received and associated with the potential instant messaging recipient, and the received persona may be saved. In one implementation, the persona is provided by a third party.

The persona assigned to the potential instant messaging recipient may configured to change upon the occurrence of a predetermined event such as the passage of a pre-determined interval of time, the passage of a pre-determined time of day, a weather condition at a predetermined geographic location, a day of the week, communication of a predetermined word, communication of a predetermined emoticon, communication of a predetermined date, and communication of a predetermined number of instant messages from the potential instant messaging recipient.

The persona assigned to the potential instant messaging recipient may be configured to change at random among more than one selected personas.

In yet another general aspect, a computer implemented method for enabling perception of multiple personas in a communications session includes rendering, on a communications recipient system, a communications application user interface for a communications session involving at least one potential communications recipient and a single potential communications sender, receiving a message that includes a text message and a persona to be displayed by the potential communications recipient when perceiving the text message, the persona being selected by the communications sender system from among multiple pre-defined personas for the single potential communications sender, each persona including a collection of one or more self-expression items, and rendering the selected persona at the potential communications recipient system when rendering another portion of the message.

Aspects of multiple personalities may be implemented by an apparatus and/or by a computer program stored on a computer readable medium. The computer readable medium may comprise a disc, a client device, a host device, and/or a propagated signal. In addition, aspects of the multiple personalities may be implemented in a client/host context or in a standalone or offline client device. The multiple personalities may be rendered in a client/host context and may be accessed or updated through a remote device in a client/host environment. The multiple personalities also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

Figure 1:
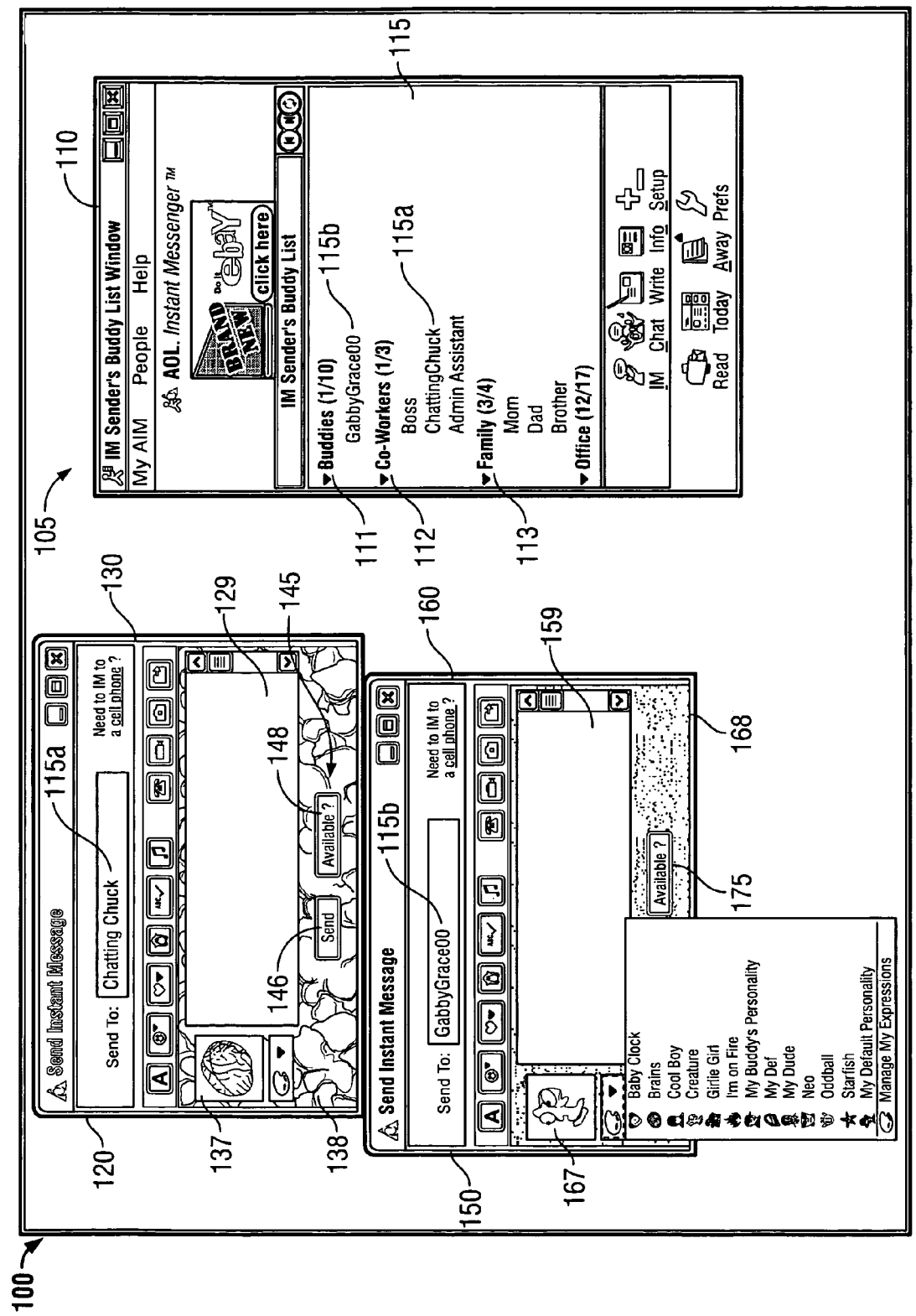
FIG. 1 is an illustration of a graphical user interface.

For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

It is possible, through the systems and techniques described herein, to enable users to assemble multiple self-expression items into a collective "persona" or "personality," which may then be saved and optionally associated with one or more customized names. Self-expression items are used to represent the IM sender or a characteristic or preference of the IM sender, and may include user-selectable binary objects. The self-expression items may be made perceivable by a potential IM recipient ("IM recipient") before, during, or after the initiation of communications by a potential IM sender ("IM sender"). For example, self-expression items may include images, such as wallpaper, that are rendered in a location having a contextual placement on a user interface. The contextual placement typically indicates an association with the user represented by the self-expression item. For instance, the wallpaper may be rendered in an area where messages from the IM sender are displayed, or as a chrome (i.e., border) around a dialog area on a user interface. Self-expression items also include icons such as buddy icons and mini-buddy icons, sounds, animation, video clips, and emoticons (e.g., smileys). The personality may also include a set of features or functionality associated with the personality. For example, features such as encrypted transmission, IM conversation logging, and forwarding of instant messages to an alternative communication system may be enabled for a given personality.

Users may assign personalities to be projected when conversing with other users, either in advance of or "on-the-fly" during a communication session. This allows the user to project different personalities to different people on-line. In particular, users may save one or more personalities (e.g., where each personality typically includes groups of instant messaging self-expression items such as, for example Buddy Icons, Buddy Sounds, Buddy Wallpaper, and Smileys, and/or a set of features and functionalities) and they may name those personalities to enable their invocation, they may associate each of different personalities with different users with whom they communicate or groups of such users so as to automatically display an appropriate/selected personality during communications with such other users or groups, or they may establish each of different personalities during this process of creating, adding or customizing lists or groups of users or the individual users themselves. Thus, the personalities may be projected to others in interactive online environments (e.g., Instant Messaging and Chat) according the assignments made by the user. Moreover, personalities may be assigned, established and/or associated with other settings, such that a particular personality may be projected based on time-of-day, geographic or virtual location, or even characteristics or attributes of each (e.g., cold personality for winter in Colorado or chatting personality while participating in a chat room).

FIG. 1 illustrates an exemplary graphical user interface 100 viewed by a user (IM sender) whose instant messaging-communication program is configured to project different personalities to two or more other users or user groups (IM recipients). In particular, the user is projecting two different personalities in two concurrent IM conversations with two different IM recipients, ChattingChuck 115a and GabbyGrace00 115b. The instant messaging communications sessions may be conducted simultaneously, near-simultaneously, or serially. A user interface (UI) 105 is rendered on the display 100 and includes an instant messaging (IM) buddy list 110, a first IM UI 120, and a second IM UI 150.

The IM buddy list 110 includes an IM sender-selected list 115 of potential instant messaging recipients ("buddies"). Buddies typically are contacts who are known to the potential instant message sender. The IM buddy list 110 may indicate to the IM sender whether or not one or more of the IM recipients on the buddy list are present, for instance, that they are or are not online and available for instant messaging communications. Buddies may be grouped by an IM sender into a user-defined or a pre-selected grouping ("groups"). As shown, the IM buddy list 110 has three categories of groups, Buddies 111, Co-Workers 112, and Family 113. At least two potential instant messaging recipients 115a, 115b are online. GabbyGrace00 115b belongs to the Buddies group 111, and ChattingChuck 115a belongs to the Co-Workers group 112.

The first IM UI 120 is rendered to the IM sender for an IM communications session with a first IM recipient, in this case ChattingChuck 115a. The first IM UI 120 includes self-expression items chosen by the IM sender to be projected to the first IM recipient 115a, such as a first buddy icon 137 and first IM wallpaper 138. The online persona defined for any particular IM, such as IM recipient 115a, includes the collection of self-expression items and/or features and functionalities. For example, the online persona may include one or more features giving a certain functionality for the IM communications session, such as automatic logging of IM conversations, encryption of IM messages, and forwarding of IM messages to another user such as an administrative assistant.

The first IM UI 120 includes an IM display and compose area 129 for composing IM messages to be sent to the first IM recipient 115a and for displaying a transcript of the IM communication session with the first IM recipient 115a. The IM display and compose area 129 also may display wallpaper that is consistent with or independent of wallpaper 138, the wallpaper within IM display and compose area 129 being selectable by the IM sender as part of the first persona.

The first IM UI 120 also includes a set of feature controls 130 and a set of transmission controls 145. The feature controls 130 may control features such as encryption, conversation logging, conversation forwarding to a different communications mode, font size and color control, and spell checking, among others. The set of transmission controls 145 includes a control 146 to send the message that was typed into the IM display and compose section 129, and a control 148 to check whether the potential IM recipient is available for IM communications.

Font and appearance controls may be provided in the feature controls 130 of IM UI 120 and configured as part of a particular persona to control how the message being entered in the IM display and compose area 129 is displayed in the IM display and compose area 129 as a transmitted message once the composed message in the IM display and compose area 129 is sent. The appearance of sent messages in the display may differ from the appearance of messages being composed in the display, but not yet sent. The display of first self-expression items 137, 138 in the first IM UI 120 enables the IM sender to conveniently perceive the online persona being projected to the particular IM recipient with whom the IM sender is presently communicating, which in this case is the first IM recipient, ChattingChuck 115a.

The second IM UI 150 is rendered to the IM sender for an IM communications session with a second IM recipient, which in this case is GabbyGrace00 115b, and has characteristics similar to those described above with respect to the first IM UI 120. However, the online persona projected by the IM sender to the second IM recipient 115b may differ from the online persona projected by the IM sender to the first IM recipient 115a, and similarly, the features and functions employed automatically with respect to the online persona for the second IM recipient 115b may be configured to differ from those employed automatically with respect to the first IM recipient 115a. For example, the persona projected to ChattingChuck 115a (the first persona) may be based on an association between the first persona and the group to which ChattingChuck 115a belongs, which in this case is the Co-Workers group 112. Or, as one alternative, the persona projected to ChattingChuck 115a may be based on an association between the persona and the individual IM recipient, i.e., ChattingChuck 115a. Similarly, the persona projected to GabbyGrace00 15b (the second persona) may be based on an association between the second persona and the group to which GabbyGrace00 115b belongs, which in this case is the Buddies group 111. Or, as one alternative, the persona projected to GabbyGrace00 115b may be based on an association between the persona and the individual IM recipient, i.e., GabbyGrace00 115b.

The second IM UI 150 includes self-expression items chosen by the IM sender to be projected to the second IM recipient 115b, such as a second buddy icon 167 and second IM wallpaper 168. The online persona defined for any particular IM recipient, such as IM recipient 115b, typically includes the collection of self-expression items, and may differ from the online persona projected to the first IM recipient 115a in the first IM UI 120. The online persona also may include features and functionality for the IM communications session with the second IM recipient 115b, such as automatic logging of IM conversations, encryption of IM messages, and forwarding of IM messages to another user such as an administrative assistant. The second IM UI 150 also includes an IM display and compose area 159 for composing IM messages to be sent to the second IM recipient 115b and for displaying a transcript of the IM communication session. The IM display and compose area 159 also may display wallpaper that is consistent with or independent of wallpaper 168, the wallpaper within IM display and compose area 159 being selected by the IM sender as part of the second persona.

The second IM UI 150 includes a set of feature controls 160, and a set of transmission controls 175. The feature controls 160 and transmission controls 175 have similar functionality to that described above with respect to the feature controls 130 and transmission controls 145 of the first IM UI 120. Font and appearance controls may be provided in the feature controls 160 of IM UI 150 and configured as part of a particular persona to control how the message being entered in the IM display and compose area 159 is displayed before and after the message in the IM display and compose area 159 is sent. The display of second self-expression items 167, 168 in the second IM UI 150 enables the IM sender to easily keep track of the online persona being projected to the particular IM recipient with whom the IM sender is communicating, which in this case is the second IM recipient, GabbyGrace00 115b.

An IM sender may create an online persona or personality from an IM sender-selected group or a pre-selected group of self-expression items and/or features and functionality. For example, an IM sender may separately choose a Buddy Icon, Sound, Wallpaper and Smiley and save the set of self-expression items as a personality with a given name, such as "Work," "Social," and "Rainy Day." The IM sender may also select certain features and functionalities to be saved under the personality. For instance, the IM sender may choose to create and save for later invocation a "Social" personality by combining a Buddy Icon of a butterfly, a Buddy Sound of laughter, a Buddy Wallpaper of musical notes, and a Smiley set of beer mugs. The IM sender may also choose not to adopt any special features or functionality for this personality. The IM sender may configure their communications system to invoke their "Social" personality for only a subset of IM recipients and that personality perhaps being defined with less than all personalization items being specified such that aspects of the Social personality are amalgamated with aspects of one or more other personalities invoked during a communication sessions with a particular IM recipient. The IM sender also may configure their communications system to invoke their "Social" personality a upon the occurrence of predetermined event at the IM sender site such as, for example, a day of the week, a holiday, or a time of day. By way of illustration, if a persona invoked for an IM recipient includes a buddy icon and a buddy sound, that persona may be modified on a Friday evening through substitution of the Social personality Buddy Sound only, maintaining the buddy icon. User-specified rules can be used as a basis for determining whether/how to amalgamate situational personalities (e.g., the Social personality) with user-based personalities.

As a second example, the IM sender may create a "Work" personality by combining a Buddy Icon of a beaver, a Buddy Sound of a clock ticking, a Buddy Wallpaper of power tools, and a Smiley set of clock faces. This Work personality may also include features and functionality such that messages sent during invocation of the Work personality are encrypted and conversations are logged/recorded, automatically or by default.

The personalities created or adopted by the IM sender may have completely different self-expression settings, or may have some overlap in self-expression settings. The personalities also may have completely different features and functionality, or may have some overlap. In the exemplary personalities described above, for example, the IM sender could change the Buddy Wallpaper so that both the "Social" and the "Work" personalities have a Buddy Wallpaper of musical notes and both send encrypted messages. In another implementation, the IM sender could choose a pre-selected set of self-expression items, which may be related by a theme. For example, the theme may relate to a favorite football team and may include a buddy icon of the team mascot, buddy wallpaper of the team colors, and a buddy sound of an excerpt of the team fight song or appropriate sound from the team mascot. In one implementation, the themed persona could be purchased or leased by the IM sender.

As a third example, the IM sender may also select certain features and functionalities to be saved under a personality and triggered upon the occurrence of an event. For instance, the IM sender may choose to create and save for later invocation a "Rainy Day" personality by combining a Buddy Icon of an umbrella, a Buddy Sound of rain falling, a Buddy Wallpaper of clouds, and a Smiley set of raindrops. The IM sender may also choose not to adopt any special features or functionality for this personality. The IM sender may configure their communications system to invoke their "Rainy Day" personality when the environmental condition experienced at the IM sender site include rain, the Rainy Day personality perhaps being invoked for only a subset of IM recipients and that personality perhaps being defined with less than all personalization items being specified such that aspects of the Rainy Day personality are amalgamated with aspects of one or more other personalities invoked during a communication sessions with a particular IM recipient. By way of illustration, if a persona invoked for an IM recipient includes a buddy icon and a buddy sound, that persona may be modified on a Rainy Day through substitution of the Rainy Day personality Buddy Sound only, maintaining the buddy icon. User-specified rules can be used as a basis for determining whether/how to amalgamate situational personalities (e.g., the Rainy Day personality) with user-based personalities.

For example, the user may invoke settings so that the Rainy Day personality is be globally applied to all other personalities based on triggers unrelated to invocation by the user of a communication session with a particular user, or it may be associated with only a subset of users if desired.

An IM sender may create multiple different personalities, one or more of which may be assigned to one or different of particular IM recipients, or groups of several IM recipients defined by the user (e.g., within the Buddy List) or otherwise. For example, the IM sender may assign her "Social" personality to one or more of her family members, who may be, for example, in a "family" group 117 of buddies but may assign her more professional and upbeat "Work" Personality to a group identified as "co-workers" in her content or Buddy list to enable future application of the Work personality to each of the constituent office colleagues forming the co-worker group 119. The particular IM recipient or recipients will see the specific personality that the IM sender has assigned them whenever they converse with the IM sender online.

As an example, if the first IM recipient 115a has been assigned the "Social" personality, then the first IM UI 120 would display a first buddy icon 137 of a butterfly, first buddy wallpaper 138 of musical notes, and a buddy sound of laughter. By contrast, if the second IM recipient 115b has been assigned the "Work" personality, then the second IM UI 150 would display a second buddy icon 167 of a beaver, second buddy wallpaper 168 of power tools, and a buddy sound of clocks ticking.

Also, an IM sender may quickly assign personalities to a specific IM recipient or group of recipients or change or modify personalities with respect to a specific IM recipient or group of recipients during an instant messaging conversation. For example, the IM sender may use a chooser that is embedded in the conversation window. An IM sender also may change personalities within a chooser interface.

This approach provides an IM sender with the ability to, among other things, save groups of expressions and/or features and functionality with custom names, assign a personality to specific IM recipients or groups of IM recipients, and access and assign the personalities quickly, for example, an interface such as the instant messaging conversation window or the chooser interface.

Personalities may be assigned on a global basis, a group basis, and/or an individual (personal) basis. Also, the self-expression items may be assigned to personalities on a per-individual basis, a per-group basis or a global basis. In one implementation, self-expression items and/or features and functionality may be assigned on a "global" basis to all individuals, a "group" basis for individuals belonging to a particular group (e.g. friends, family, or co-workers), or an "individual" basis for a single individual IM recipient.

The persona may be changed by the IM sender before, during, or after an IM communication session with an IM recipient. In one implementation, the persona may change, or the user may be prompted to change, the persona after a pre-determined period of time or upon other conditions, such as a day of the week, a time of day, a holiday, a calendar event such as a birthday or wedding, a weekday, or a weekend day. In another implementation the persona, could change upon the occurrence of an event, such as a holiday or upon detecting certain language or emoticons in the IM conversation. In yet another implementation, the persona could change randomly.

Typically, IM communications involve an instantaneous or nearly instantaneous communication between two users, where each user is able to transmit, receive and display communicated information. Additionally, IM communications generally involve the display and perception of online presence information regarding other selected IM recipients. IM communications may be machine-to-machine communications that occur without intervention by or communication through an instant messaging server after a communication session is established or authentication is performed.

Figure 2:
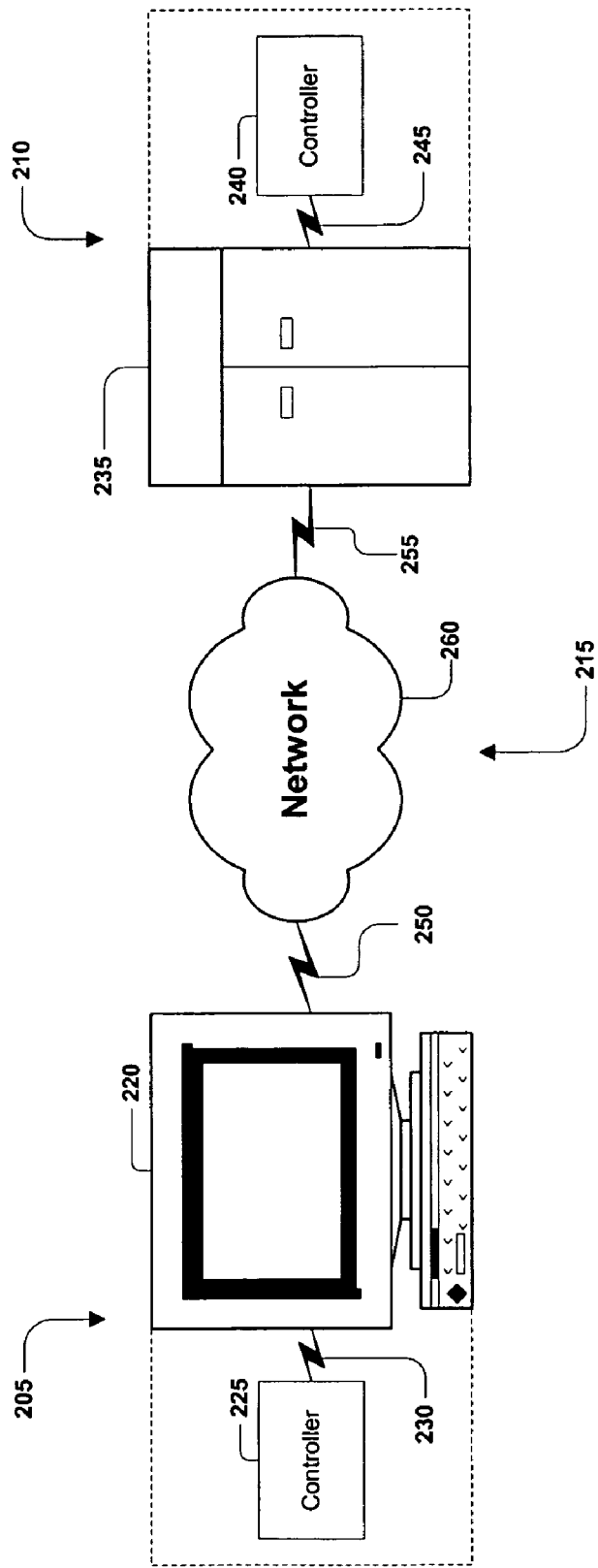
FIGS. 2-4 and 14 are block diagrams of an exemplary communications system.
Figure 3:
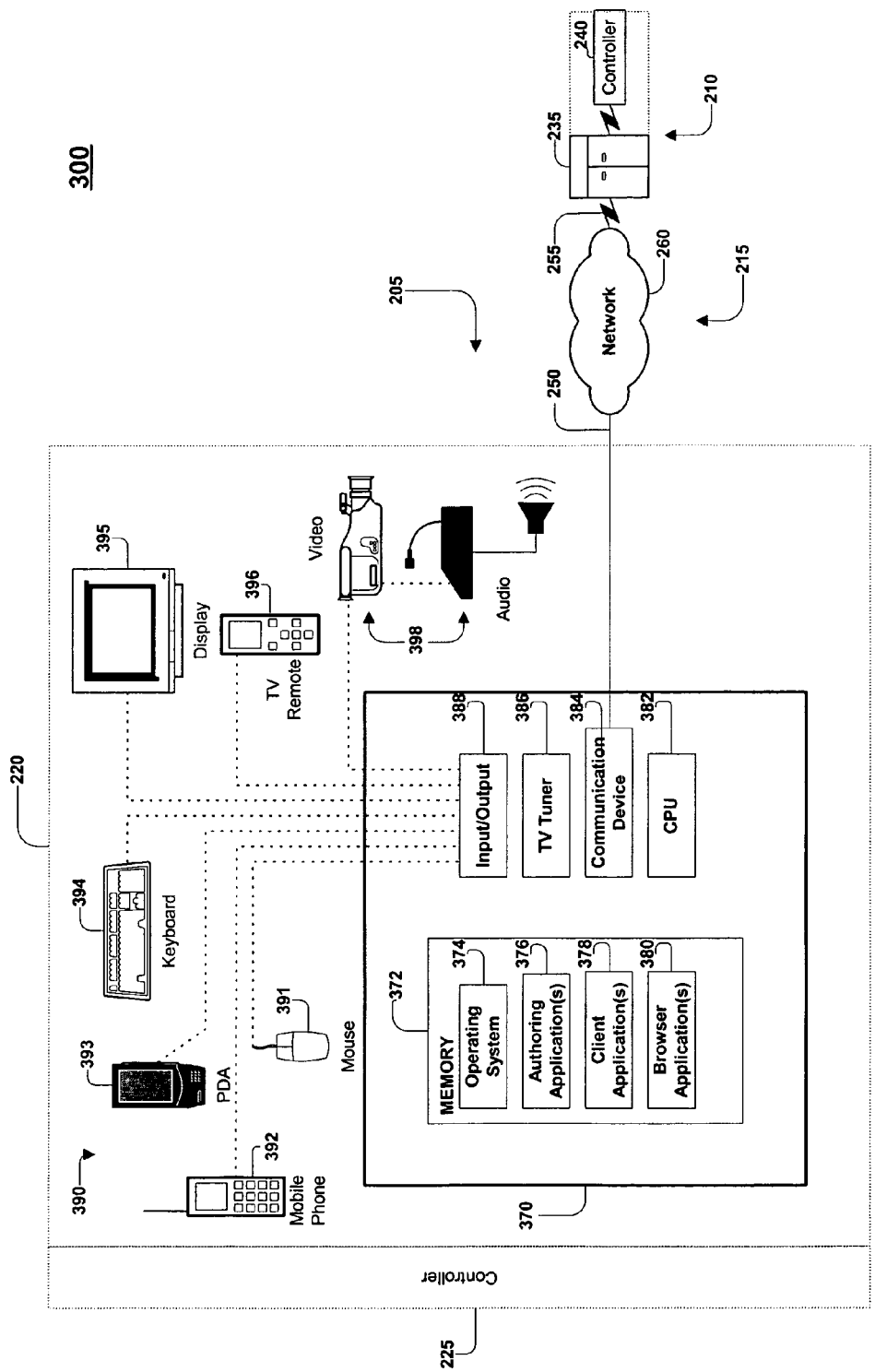
Figure 4:
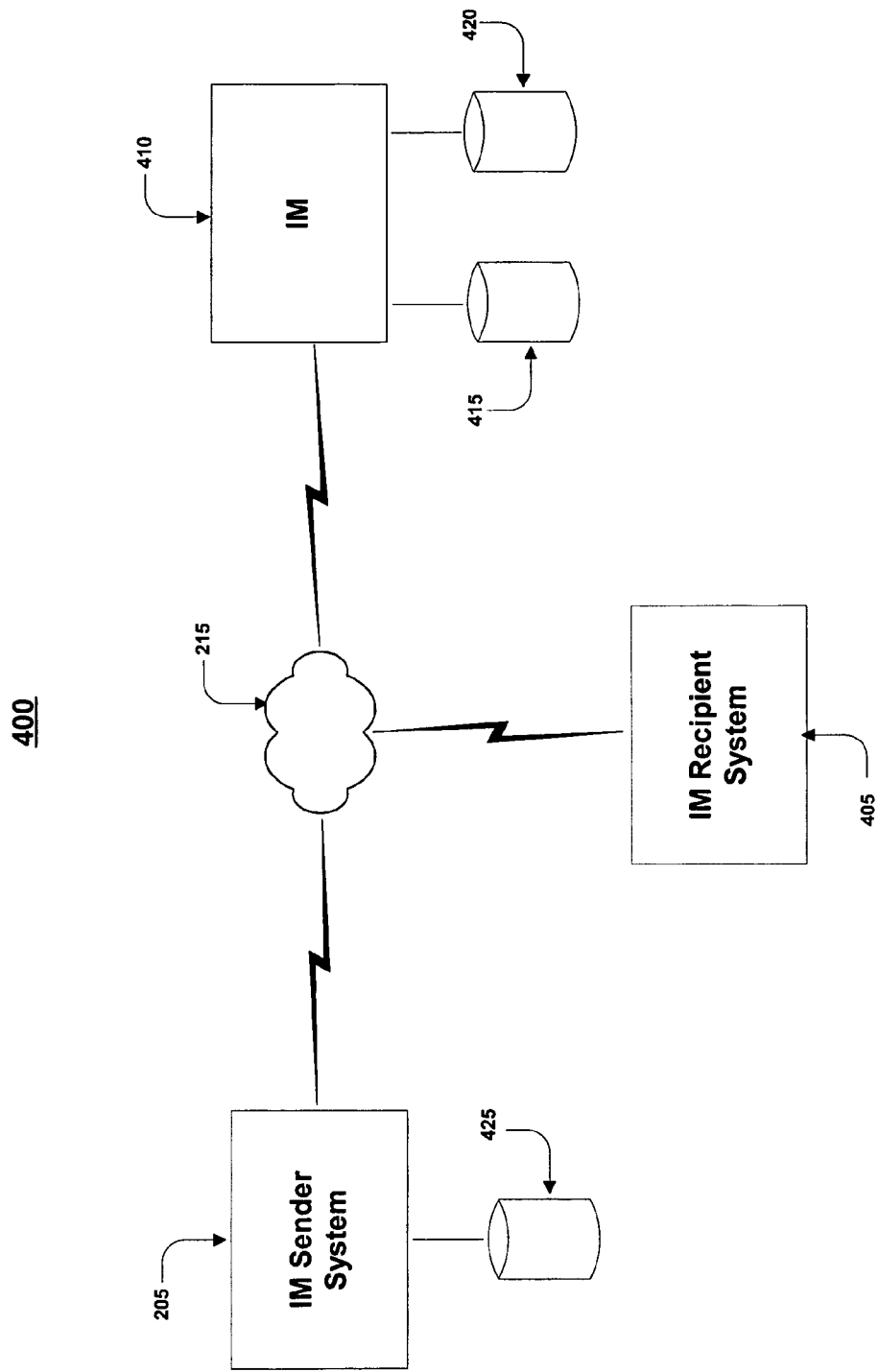

For illustrative purposes, FIGS. 2, 3 and 4 show an example of a communications system for implementing techniques for transferring electronic data.

Referring to FIG. 2, a communications system 200 is capable of delivering and exchanging data between an IM sender system 205 and a host system 210 through a communications link 215. The IM sender system 205 typically includes one or more client devices 220 and/or client controllers 225, and the host system 210 typically includes one or more host devices 235 and/or host controllers 240. For example, the IM sender system 205 or the host system 210 may include one or more general-purpose computers (e.g., personal computers), one or more special-purpose computers (e.g., devices specifically programmed to communicate with each other and/or the IM sender system 205 or the host system 210), or a combination of one or more general-purpose computers and one or more special-purpose computers. The IM sender system 205 and the host system 210 may be arranged to operate within or in concert with one or more other systems, such as, for example, one or more LANs ("Local Area Networks") and/or one or more WANs ("Wide Area Networks").

The client device 220 and the host device 235 are generally capable of executing instructions under the command of, respectively, a client controller 225 and a host controller 240. The client device 220 and the host device 235 are connected to, respectively, the client controller 225 and the host controller 240 by, respectively, wired or wireless data pathways 230 and 245, which are capable of delivering data.

The client device 220, the client controller 225, the host device 235, and the host controller 240 typically each include one or more hardware components and/or software components. An example of a client device 220 or a host device 235 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 220 and the host device 235 may include devices that are capable of establishing peer-to-peer communications.

An example of client controller 225 or host controller 240 is a software application loaded on the client device 220 or the host device 235 for commanding and directing communications enabled by the client device 220 or the host device 235. Other examples include a program, a piece of code, an instruction, a device, a computer, a computer system, or a combination of these for independently or collectively instructing the client device 220 or the host device 235 to interact and operate as described. The client controller 225 and the host controller 240 may be embodied permanently or temporarily in any type of machine, component, physical or virtual equipment, storage medium, or propagated signal capable of providing instructions to the client device 220 and the host device 235.

The communications link 215 typically includes a delivery network 260 that provides direct or indirect communication between the IM sender system 205 and the host system 210, irrespective of physical separation. Examples of a delivery network 260 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 215 may include communication pathways 250 and 255 that enable communications through the one or more delivery networks 260 described above. Each of the communication pathways 250 and 255 may include, for example, a wired, wireless, cable or satellite communication pathway.

FIG. 3 illustrates a communications system 300 including an IM sender system 205 communicating with a host system 210 through a communications link 215.

The IM sender system 205 includes a client device 220 that typically includes a general-purpose computer 370 having an internal or external memory 372 for storing data and programs such as an operating system 374 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 376 (e.g., word processing programs, database programs, spreadsheet programs, or graphics programs) capable of generating documents or other electronic content; client applications 378 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 380 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 372 of the general-purpose computer 370. Alternatively, in another implementation, the client controller 225 may access application programs externally stored in and/or performed by one or more device(s) external to the general-purpose computer 370.

The general-purpose computer 370 also includes a central processing unit 382 (CPU) for executing instructions in response to commands from the client controller 225, and a communication device 384 for sending and receiving data. One example of the communication device 384 is a modem. Other examples include a transceiver, a set-top box, a communication card, a satellite dish, an antenna, a network adapter, or some other mechanism capable of transmitting and receiving data over the communications link 215 through a wired or wireless data pathway 250. The general-purpose computer 370 optionally includes a television ("TV") tuner 386 for receiving television programming in the form of broadcast, satellite, and/or cable TV signals. The TV tuner 386 permits the client device 220 to selectively and/or simultaneously display network content received by communications device 384 and TV programming content received by the TV tuner 386.

The general-purpose computer 370 may include an input/output interface 388 that enables wired or wireless connection to various peripheral devices 390. Examples of peripheral devices 390 include, but are not limited to, a mouse 391, a mobile phone 392, a personal digital assistant (PDA) 393, an MP3 player (not shown), a keyboard 394, a display monitor 395 with or without a touch screen input, a TV remote control 396 for receiving information from and rendering information to users, and an audiovisual input device 398.

Although FIG. 3 illustrates devices such as a mobile telephone 392, a PDA 393, and a TV remote control 396 as being peripheral with respect to the general-purpose computer 370, in another implementation, such devices may themselves include the functionality of the general-purpose computer 370 and operate as the client device 220. For example, the mobile phone 392 or the PDA 393 may include computing and networking capabilities and function as a client device 220 by accessing the delivery network 260 and communicating with the host system 210. Furthermore, the IM sender system 205 may include one, some or all of the components and devices described above.

FIG. 4 illustrates a communications system 400 including an IM sender system 205 communicating with an IM recipient system 405 and an IM host system 410 through a communication link 215. Such a communications system may be used by users of IM service providers, such as, for example, AIM, ICQ, Yahoo Messenger, and Microsoft Messenger.

In one implementation, the IM host system 410 may have characteristics similar to those described above with respect to the host system 210, the IM recipient system 405 may have characteristics similar to those described above with respect to the IM sender system 205, and the IM sender system 205 and the IM recipient system 405 may include communication software to enable users of the client systems to access the IM host system 410.

The IM host system 410 may support IM services irrespective of an IM sender's network or Internet access. Thus, the IM host system 410 may allow users to send and receive IMs, regardless of whether they have access to any particular ISP. The IM host system 410 also may support associated services, such as administrative matters, advertising, directory services, chat, and interest groups related to the IM. The IM host system 410 has an architecture that enables the devices (e.g., servers) within the IM host system 410 to communicate with each other. To transfer data, the IM host system 410 employs one or more standard or proprietary IM protocols.

To access the IM host system 410 to begin an IM session in the implementation of FIG. 4, the IM sender system 205 establishes a connection to the IM host system 410. Once a connection to the IM host system 410 has been established, the IM sender system 205 may directly or indirectly transmit data to and access content from the IM host system 410. By accessing the IM host system, an IM sender can use the IM client application to view whether particular users are online, exchange IMs with particular IM recipients, participate in group chat rooms, trade files such as pictures, invitations or documents, find other IM recipients with similar interests, get customized information such as news and stock quotes, and search the Web. IM recipient system 405 may be similarly manipulated to establish contemporaneous connection with IM host system 410.

Once connectivity is established, an IM sender who is using IM sender system 205 may view whether an IM recipient using IM recipient system 405 is online, and typically may view whether the IM recipient is able to receive IMs. If the IM recipient is online, the IM sender may exchange IMs with the IM recipient.

Furthermore, the IM sender may view or perceive certain aspects of a personality selected by a potential IM recipient prior to engaging in communications with that potential IM recipient. For example, certain aspects of an IM recipient selected personality, such as a buddy icon or a miniature buddy icon chosen by the IM recipient, may be perceivable through the buddy list itself prior to engaging in communications. Other aspects of a selected personality chosen by an IM recipient may be made perceivable upon opening of a communication window by the IM sender for a particular IM recipient but prior to initiation of communications.

In one implementation, the IMs sent between IM sender system 205 and IM recipient system 405 are routed through IM host system 410. In another implementation, the IMs sent between IM sender system 205 and IM recipient system 405 are routed through a third party server (not shown), and, in some cases, are also routed through IM host system 410. In yet another implementation, the IMs are sent directly between IM sender system 205 and IM recipient system 405.

As shown in FIG. 4, the IM host system may include a data store 415 for one or more personalities for one or more instant messaging senders. The IM host system may also include a data store 420 for available attributes of personalities. The attributes may include easily selectable items made available to a user while building a personality and as such, are not intended to represent all possible options. The personalities also may be stored locally in a data store 425 at the IM sender system 205.

Figure 5:
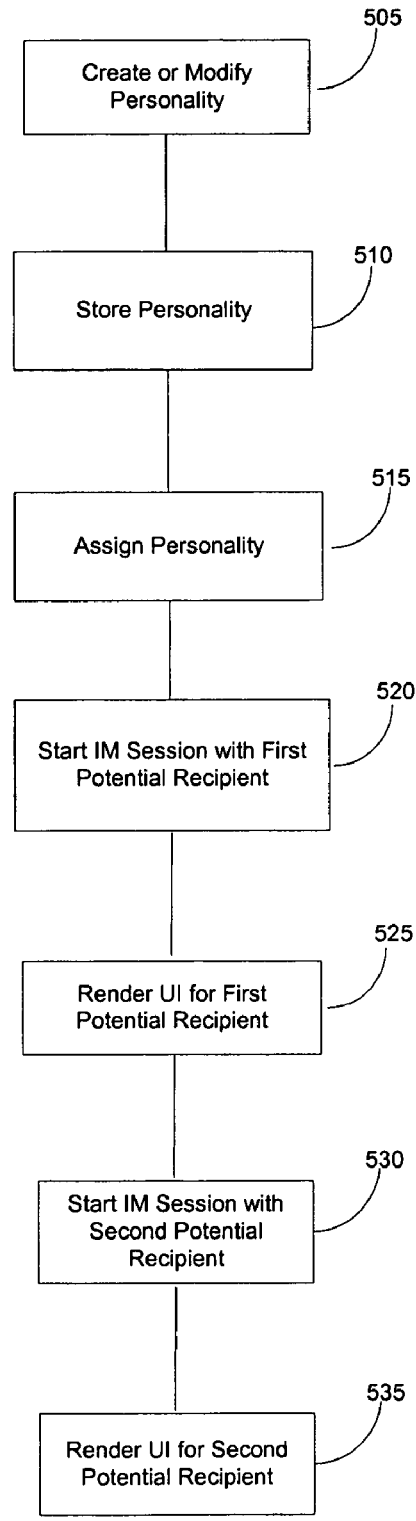
FIGS. 5 and 6 are flow charts of exemplary processes that may be implemented by systems such as those of FIGS. 2-4 and 14.

FIG. 5 shows an exemplary procedure 500 to enable an IM sender to select an online persona to be made perceivable to an IM recipient.

The procedure 500 may be implemented in a client/host context, or a standalone or offline client context. For example, while some functions of procedure 500 may be performed entirely by the IM sender system 205, other functions may be performed by host system 210, or the collective operation of the IM sender system 205 and the host system 210. In procedure 500, the online persona may be respectively selected and rendered by the standalone/offline device, and the online persona may be accessed or updated through a remote device in a non-client/host environment such as, for example, a LAN server serving an end user or a mainframe serving a terminal device. Thus, the procedure 500 described below may be implemented for an OSP, ISP, browser and/or other software program having a graphical user interface, such as programs for instant messaging, chat, electronic mail and stand-alone browsers. Moreover, procedure 500 may be implemented by hardware, software, devices, computers, computer systems, equipment, components, programs, applications, code, storage media, or propagated signals.

Procedure 500 generally involves selecting and projecting an online persona. The IM sender creates or modifies one or more online personalities (step 505). As discussed above with respect to FIG. 1, creating an online persona generally involves the IM sender selecting one or more self-expression items and/or features and functionalities to be displayed to a certain IM recipient or group of IM recipients.

Figure 7:
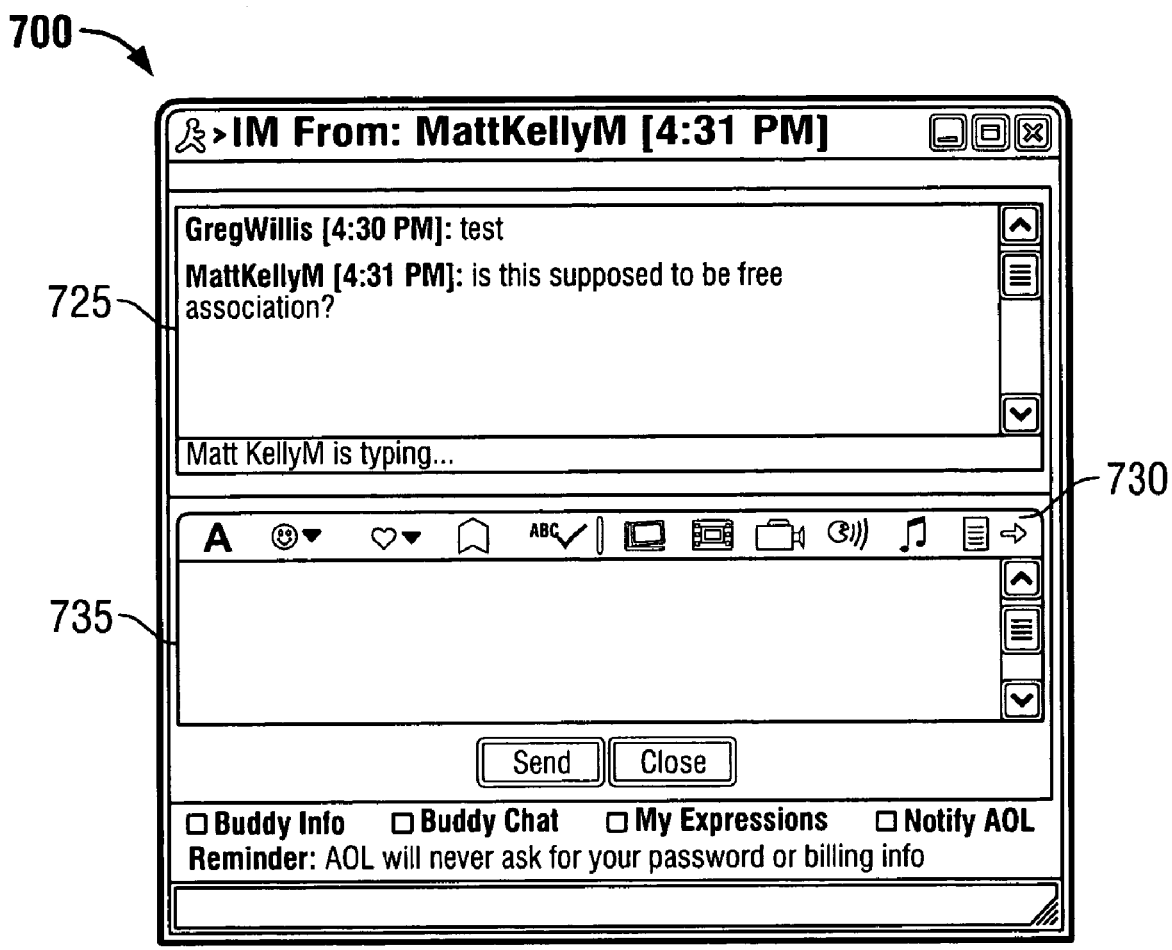
FIGS. 7-13 is an illustration of different graphical user interfaces that may be implemented by systems such as those of FIGS. 2-4 and 14 when executing a process such as that of FIGS. 5 and 6.

FIG. 7 shows a basic IM user interface (UI) 700A. IN UI 700 has an IM recipient portion 725 and an IM sender portion 735. IM UI 700 also has a set of feature controls 730. As shown, IM UI 700 does not have any self-expression items or any features or functionalities selected.

Figure 8:
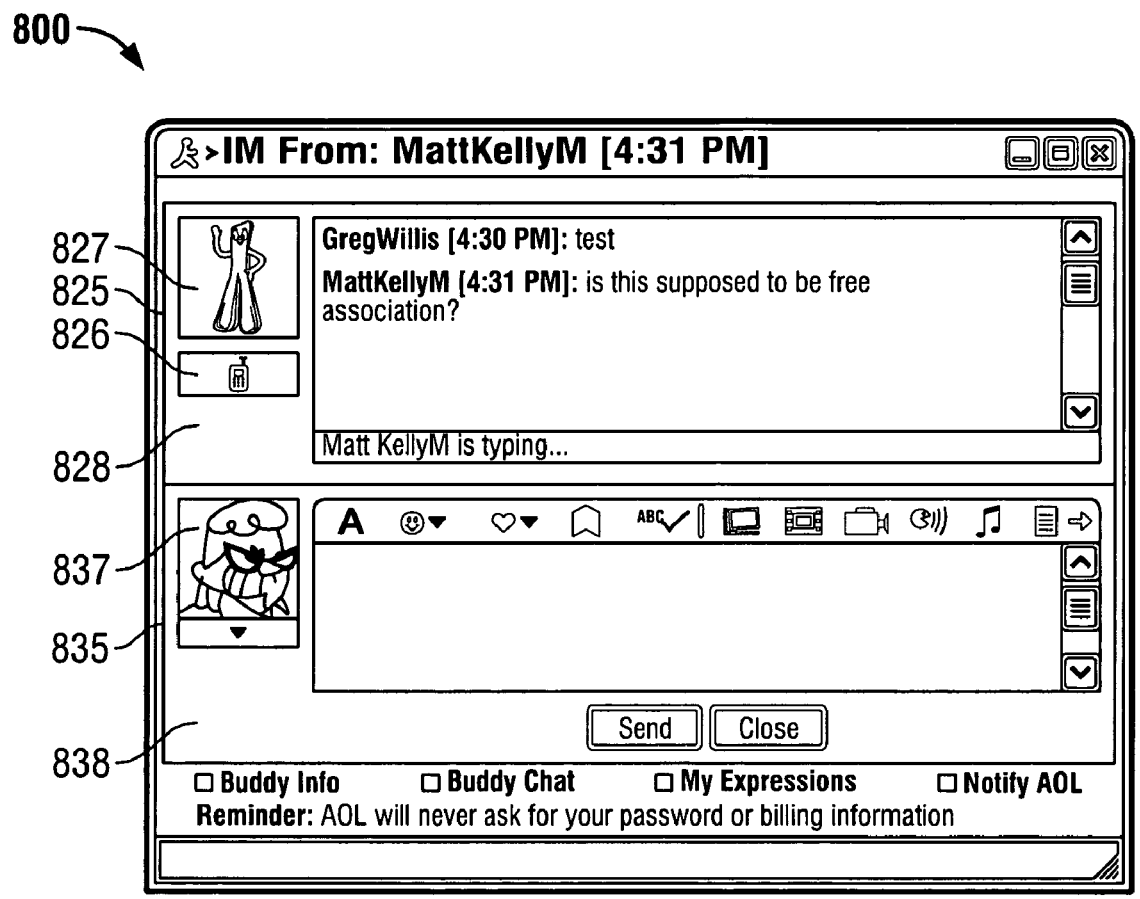

FIG. 8 shows an IM UI 800 with personalization items such as a buddy icon 837 chosen by the IM sender when having an IM conversation with a particular IM recipient, and a buddy icon 827 of the particular IM recipient with whom the IM sender is having an IM conversation. IM UI 800 has an IM recipient portion 825 and an IM sender portion 835. The IM recipient portion 825 displays the buddy icon 827 and wallpaper 828 chosen by the IM recipient with whom the IM sender is having a conversation. The IM recipient portion also contains an icon 826 that indicates that the IM sender is using a mobile device. Upon receipt of such an icon, changes in the personality of the IM sender may be automatically triggered or offered automatically to the IM sender. For example, the IM sender may be presented an option to project a buddy icon or wallpaper that presents better to lower resolution devices or to eliminate self-expressions related to graphics altogether to conserve bandwidth and storage, based on whether the mobile device is capable of rendering such self-expression items to the IM recipient. The IM sender may wish to change other self-expression items or features/functions when an indication is received that the IM recipient is using a mobile device or other devices less capable of handling particular self-expressions items. The IM sender portion 835 contains the buddy icon 837 and wallpaper 838 currently being made perceivable by the IM sender to the IM recipient with whom the IM sender is having an IM conversation.

Figure 9:
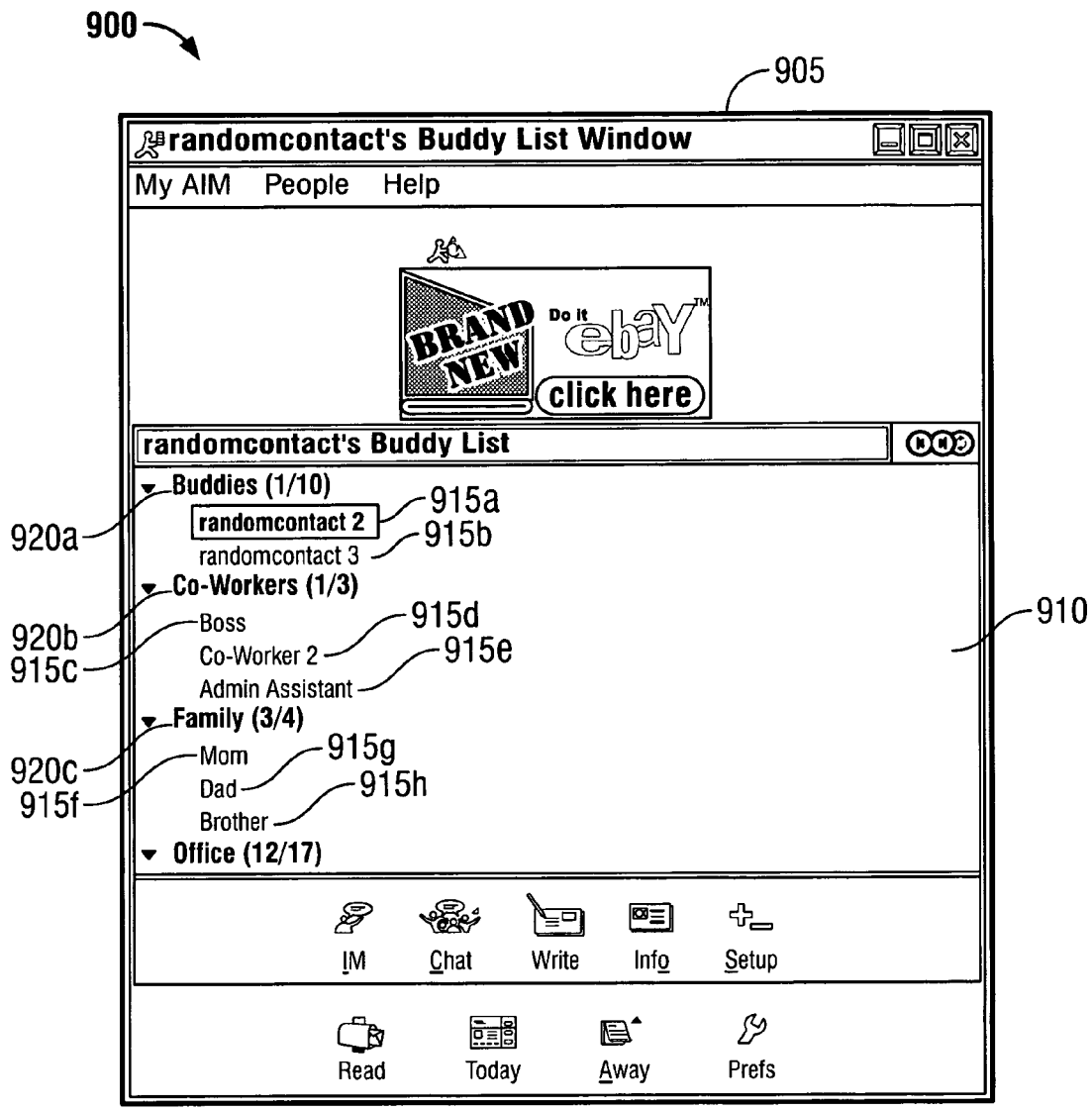

FIG. 9 illustrates a desktop 900 with an exemplary buddy list interface 905 presented to a IM sender (e.g., "randomcontact") when an instant messaging client program is running on a client systems.

In FIG. 9, a desktop 900 is shown with a buddy list user interface 905 of the instant messaging client program. User interface 905 has a box 910 that displays representations 915a-915h of the IM sender's buddies. In the interface 905, the representations 915a-915h are icons showing the screen names of the IM recipients, however, other types or forms of representations may be used. The representations 915a-915h may provide contextual information to the program IM sender about the buddy, such as whether the buddy is online, how long the buddy has been online, whether the buddy is away, or whether the buddy is using a mobile device.

The list of IM recipients displayed in box 910 of user interface 905 typically is referred to as the buddy list. In the buddy list, IM recipients are grouped together into buddy groups. The name or representation of each buddy group is displayed in the buddy list. When a buddy's IM client program is able to receive communications, the representation of the buddy in the buddy list is displayed under the name or representation of the buddy group to which the buddy belongs. For example, in the interface shown by FIG. 9, the buddy whose screen name is "randomcontact2" is part of the Buddies buddy group and, consequently, the representation 915a for randomcontact2 is listed under the representation 920a for the Buddies buddy group. Likewise, the buddy whose screen name is "Boss" is part of the Co-Workers buddy group and, consequently, the representation 915c for Boss is listed under the representation 920b for the Co-Workers buddy group. Similarly, the IM recipients whose screen names are "Mom," "Dad," and "Brother" are part of the Family buddy group 920c and, consequently, their representations 915f-915h are listed under the representation 920c for the Family buddy group.

In creating personalities, the IM sender may forbid a certain personality to be shown to designated IM recipients and/or groups. For example, if the IM sender wants to ensure that the "Casual" personality is not accidentally displayed to the boss or to co-workers, the IM sender may prohibit the display of the "Casual" personality to the boss on an individual basis, and may prohibit the display of the "Casual" personality to the "Co-workers" group on a group basis. An appropriate user interface may be provided to assist the IM sender in making such a selection. Similarly, the IM sender may be provided an option to "lock" a personality to a IM recipient or a group of IM recipients to guard against accidental or unintended personality switching and/or augmenting. Thus, for example, the IM sender may choose to lock the "Work" personality to the boss on an individual basis, or to lock the "Work" personality to the "Co-workers" group on a group basis. In one example, the Casual personality will not be applied to a locked personality. A UI may be provided to assist the IM sender in making such a selection.

Figure 10:
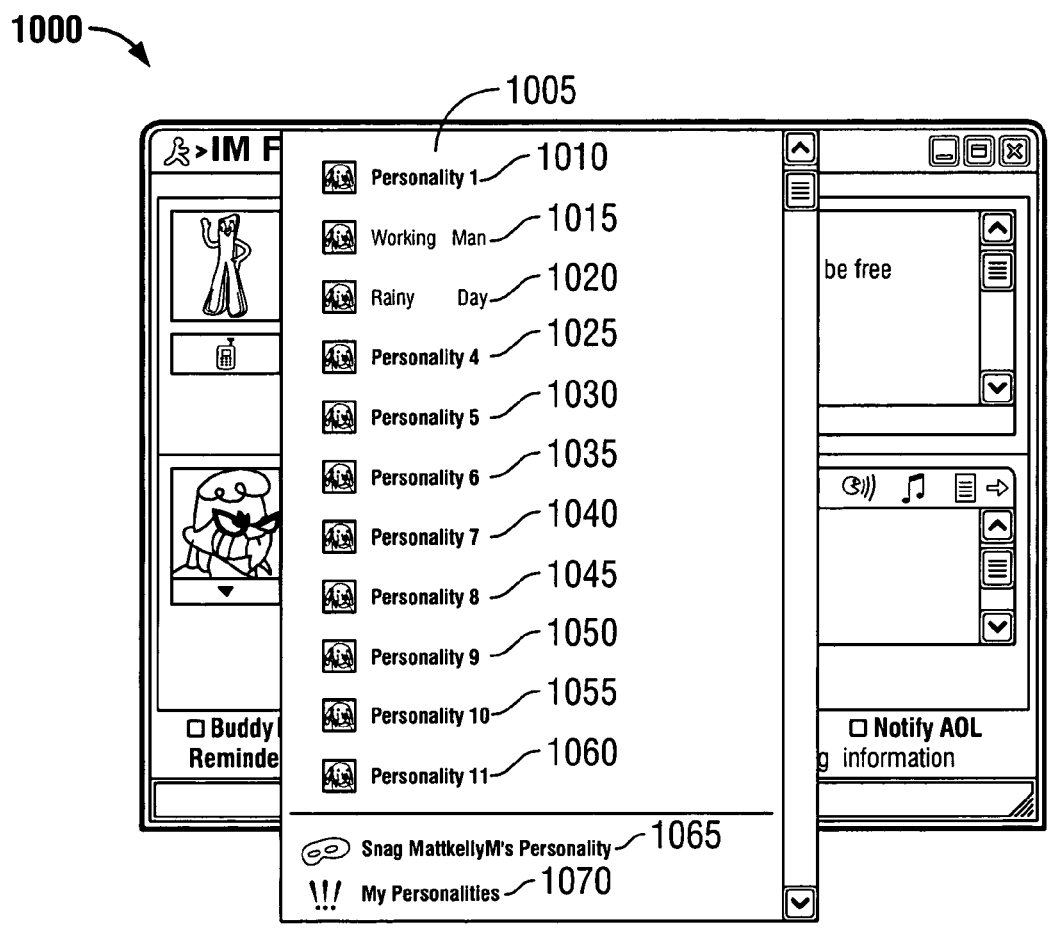

FIG. 10 shows a chooser UI 1000 that enables the IM sender to select among available personalities 1010, 1015, 1020, 1025, 1030, 1035, 1040, 1045, 1050, 1055, 1060. The UI also has a control 1065 to enable the IM sender to "snag" the personality of a buddy, and a control 1070 to review the personality settings currently selected by the IM sender. Through the use of the chooser UI 1000, the user may change the personality being projected to the IM recipient before, during, or after the IM conversation with the recipient.

Figure 11:
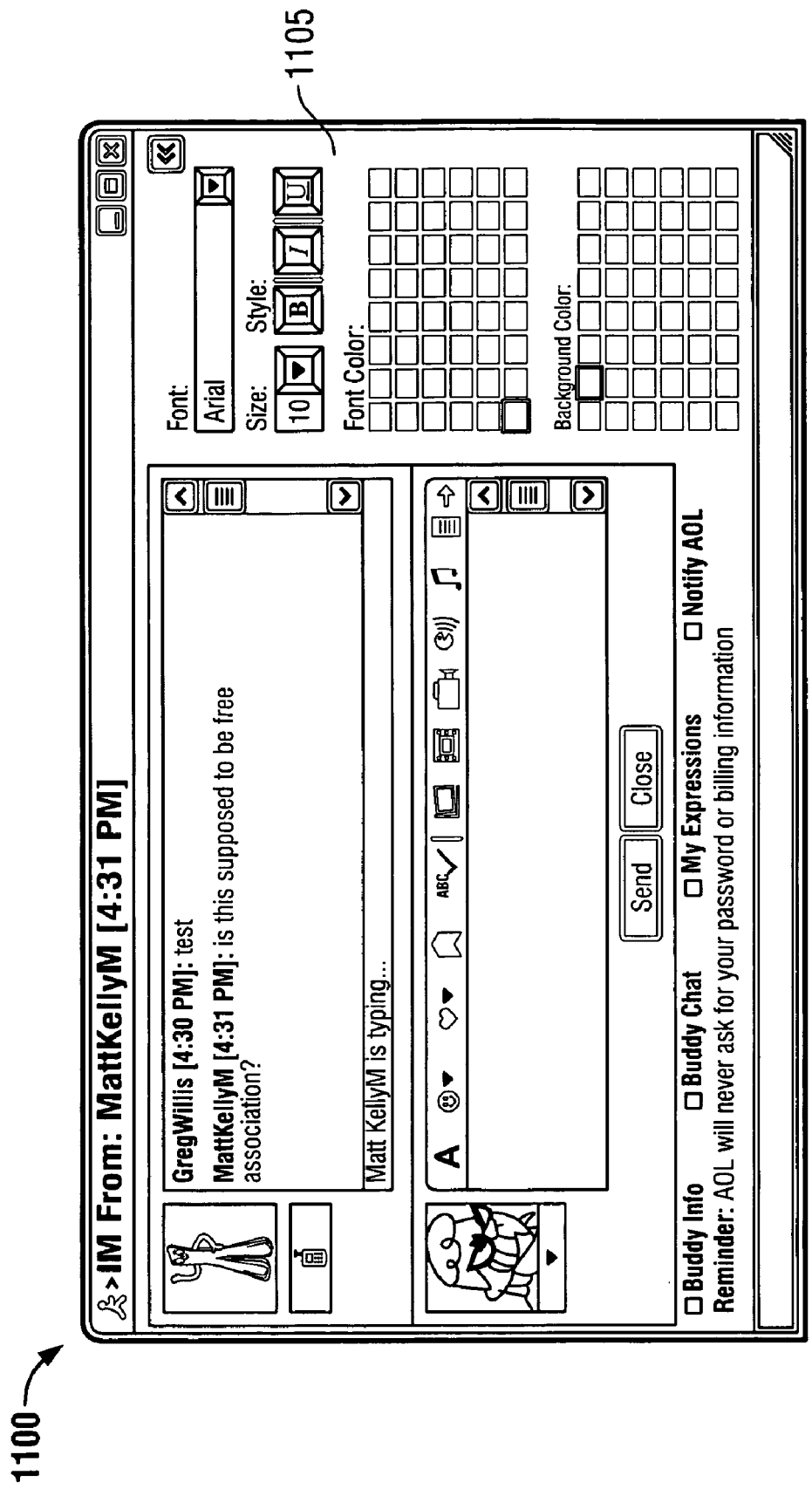

FIG. 11 shows a UI 1100 for font and color adjustments 1105 that a IM sender may employ in creating a personality. Specifically, although shown in the context of an active conversation between an IM sender and an IM recipient, UI 1100 may be used to specify the font and color to be applied to text communicated under the guise of a particular personality, such as those shown at FIG. 10, and to select different fonts/colors for different of several personalities. The UI 1100 may be invoked by user action such as, for example, right clicking on a mouse button or otherwise manipulating a user input device.

Figure 12A:
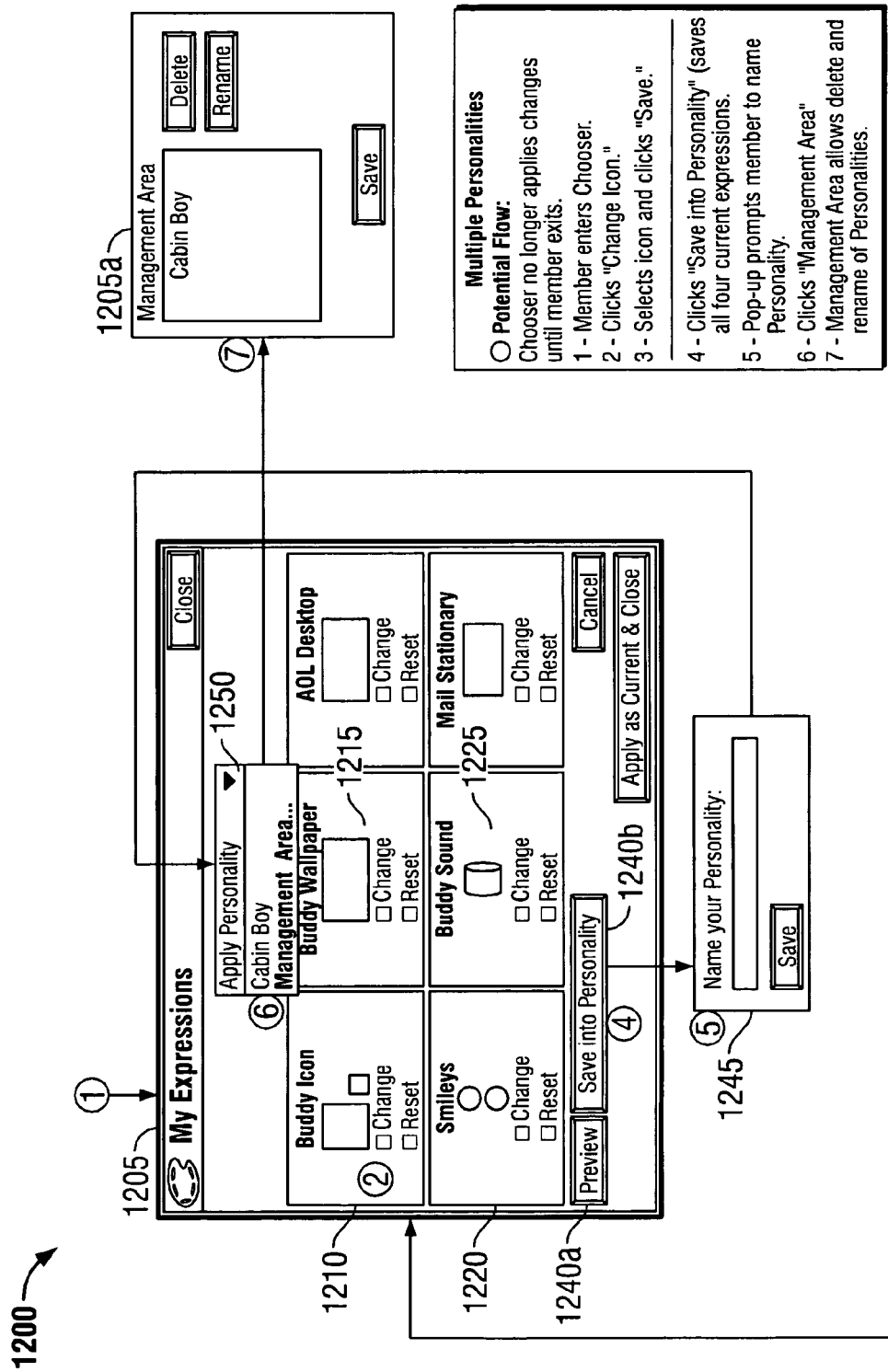
Figure 12B:
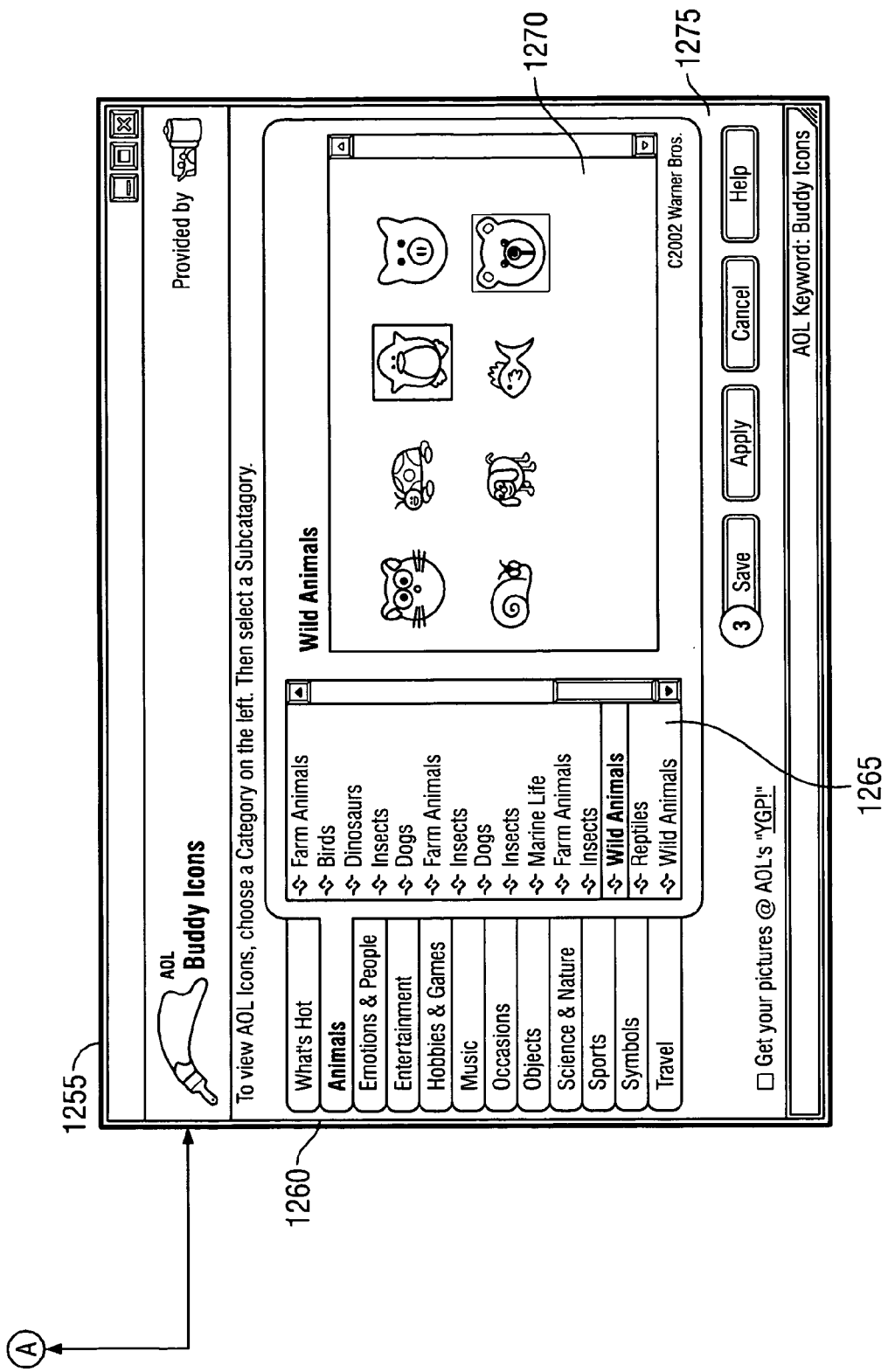
Figure 12C:
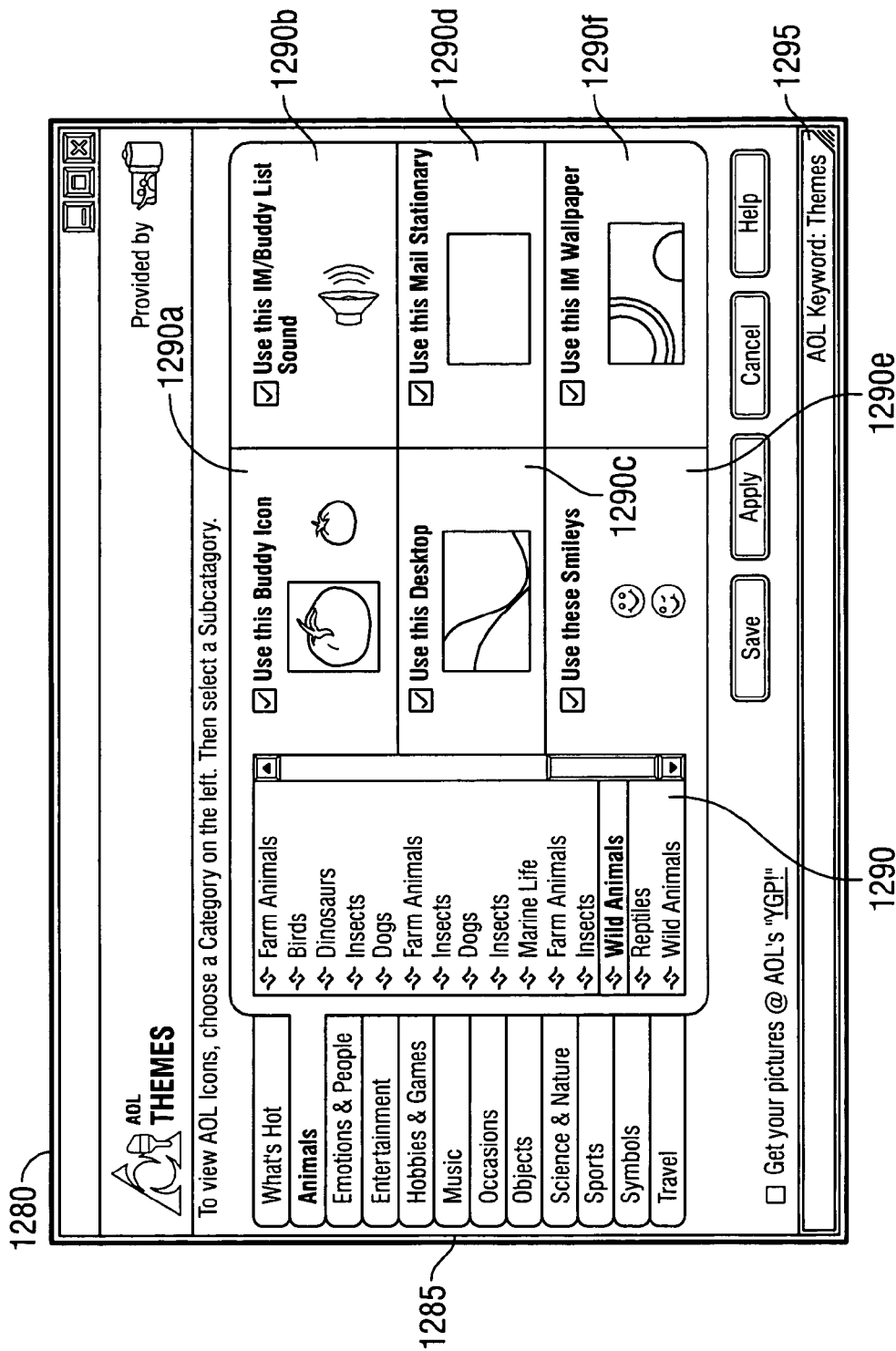

FIG. 12 shows a series 1200 of exemplary UIs 1205, 1255, 1280 for enabling a IM sender to create and store a personality, and/or select various aspects of the personality such as buddy icons, buddy wallpaper, buddy sounds, and smileys. As shown, UI 1205 enables an IM sender to select a set of one or more self-expression items and save the set of self-expression items as a personality. The UI 1205 also enables an IM sender to review and make changes to an IM personality. For example, the UI 1205 enables an IM sender to choose a buddy icon 1210, buddy wallpaper 1215, emoticons 1220, and buddy sounds 1225. A set of controls 1240 is provided to enable the IM sender to preview 1240a the profile and to save 1240b these selected self-expression items as a personality. The IM sender is able to name and save the personality 1245 and then is able to apply the personality 1250 to one or more individual IM recipients or one or more groups of IM recipients. A management area 1250a is provided to enable the IM sender to delete, save, or rename various IM personalities. In choosing the self-expression items, other interfaces such as UI 1255 may be displayed to enable the IM sender to select the particular self-expression items. UI 1255 includes a set of themes 1260 for buddy icons which enables an IM sender to select a particular theme 1265 and choose an individual icon 1270 in the selected theme. A set of controls 1275 is provided to assist the IM sender in making the selection of self-expression items. Also, an IM sender may be enabled to choose a pre-determined theme, for example, by using a UI 1280. In UI 1280, the IM sender may select various categories 1285 of pre-selected themes and upon selecting a particular category 1290, a set of default pre-selected, self-expression items is displayed, 1290a, 1290b, 1290c, 1290d, 1290e, and 1290f. The set may be unchangeable or the IM sender may be able to individually change any of the pre-selected self-expression items in the set. A control section 1295 is also provided to enable the IM sender to select the themes.

In another implementation, the features or functionality of the IM interface may vary based upon user-selected or pre-selected options for the personality selected or currently in use. The features or functionality may be transparent to the IM sender. For example, when using the "Work" personality, the outgoing IM messages may be encrypted, and a copy may be recorded in a log, or a copy may be forwarded to a designated contact such as an administrative assistant. A warning may be provided to an IM recipient that the IM conversation is being recorded or viewed by others, as appropriate to the situation. By comparison, if the non-professional "Casual" personality is selected, the outgoing IM messages may not be encrypted and no copy is recorded or forwarded.

As a further example, if the "Work" personality is selected and the IM sender indicates an unavailability to receive instant messages (e.g., through selection of an "away" message or by going offline), then messages received from others during periods of unavailability may be forwarded to another IM recipient such as an administrative assistant, or may be forwarded to an e-mail address for the IM sender. By comparison, if the non-professional "Casual" personality is selected, no extra measures are taken to ensure delivery of the message.

In one implementation, the features and functionality associated with the personality would be transparent to the IM sender, and may be based upon one or more pre-selected profiles types when setting up the personality. For example, the IM sender may be asked to choose from a group of personality types such as professional, management, informal, vacation, offbeat, etc. In the example above, the "Work" personality may have been be set up as a "professional" personality type and the "Casual" personality may have been set up as an "informal" personality type. In another implementation, the IM sender may individually select the features and functionalities associated with the personality.

An "enterprise mode" may be provided for use with a personality, and the features and functionality associated with the enterprise mode may be established by an employer or its agent, and may vary depending upon the requirements of the environment. For example, where a record of the IM conversation is being maintained, a legal notice may be provided to one or more of the participants in the IM conversation, where such notice is necessary or desirable. The enterprise mode may enable functionality such as encryption, recording of the IM conversation, and forwarding of the IM conversation to an administrative assistant.

In one implementation, the IM recipient and/or the IM sender may pay a subscription fee to access/use certain personalities, and the personalities may be provided by a third party. In another implementation, the personalities expire and must be replaced after a predetermined event such as a pre-determined length of time, passage of a predetermined date, or a predetermined number of uses. Also, a personality may be banned if, for example, it is deemed to be offensive, inappropriate, or to otherwise violate a term of service agreement. If it is determined that the personality is expired or banned, display of such a personality will be disallowed and the IM sender typically will be required to choose a different personality.

Default global personalization items, default group personalization items, or default personal personalization items, may be provided, depending on the implementation. For example, if the Buddies buddy group is provided as a default upon installation of the instant messaging client program, a default group personalization item also may be provided for the Buddies buddy group. As another example, a default global personalization item may be provided when the instant messaging client program is installed so that a personalization item always exists for the IM recipients, regardless of whether a IM sender has selected a personality or personalization item to be presented. Similarly, a default group personalization item may be provided for any default buddy groups and newly created buddy groups, whether or not a global personalization item is provided. This enables a personality to always exist for IM recipients even when no global personalization item or personality exists, regardless of whether a IM sender has set a group personalization item (or personal personalization item, if implemented also). Features and functionality may be assigned to personalities in a similar manner as described with respect to self-expression items.

Referring again to FIG. 5, the personality is then stored (step 510). The personality may be stored on the IM sender system 205, on the IM host system 410, or on a different host system 210 such as a host system of an authorized partner.

Next the IM sender assigns a personality to be projected during future IM sessions or when engaged in future IM conversations with an IM recipient (step 515). The IM sender may wish to display different personalities to different IM recipients and/or groups in the buddy list. The IM sender may use a user interface to assign personalization items to personalities on at least a per-buddy group basis. For example, an IM sender may assign a global buddy icon to all personalities, but assign different buddy sounds on a per-group basis to other personalities (e.g. work, family, friends), and assign buddy wallpaper and smileys on an individual basis to individual personalities corresponding to particular IM recipients within a group. The IM sender may assign other personality attributes based upon the occurrence of certain predetermined events or triggers. For example, certain potential IM recipients may be designated to see certain aspects of the Rainy Day personality if the weather indicates rain at the geographic location of the IM sender. Default priority rules may be implemented to resolve conflicts, or the user may select priority rules to resolve conflicts among personalities being projected or among self-expression items being projected for an amalgamated personality.

For example, a set of default priority rules may resolve conflicts among assigned personalities by assigning the highest priority to personalities and self-expression items of personalities assigned on an individual basis, assigning the next highest priority to assignments of personalities and personalization items made on a group basis, and assigning the lowest priority to assignments of personalities and personalization items made on a global basis. However, the user may be given the option to override these default priority rules and assign different priority rules for resolving conflicts.

Figure 13:
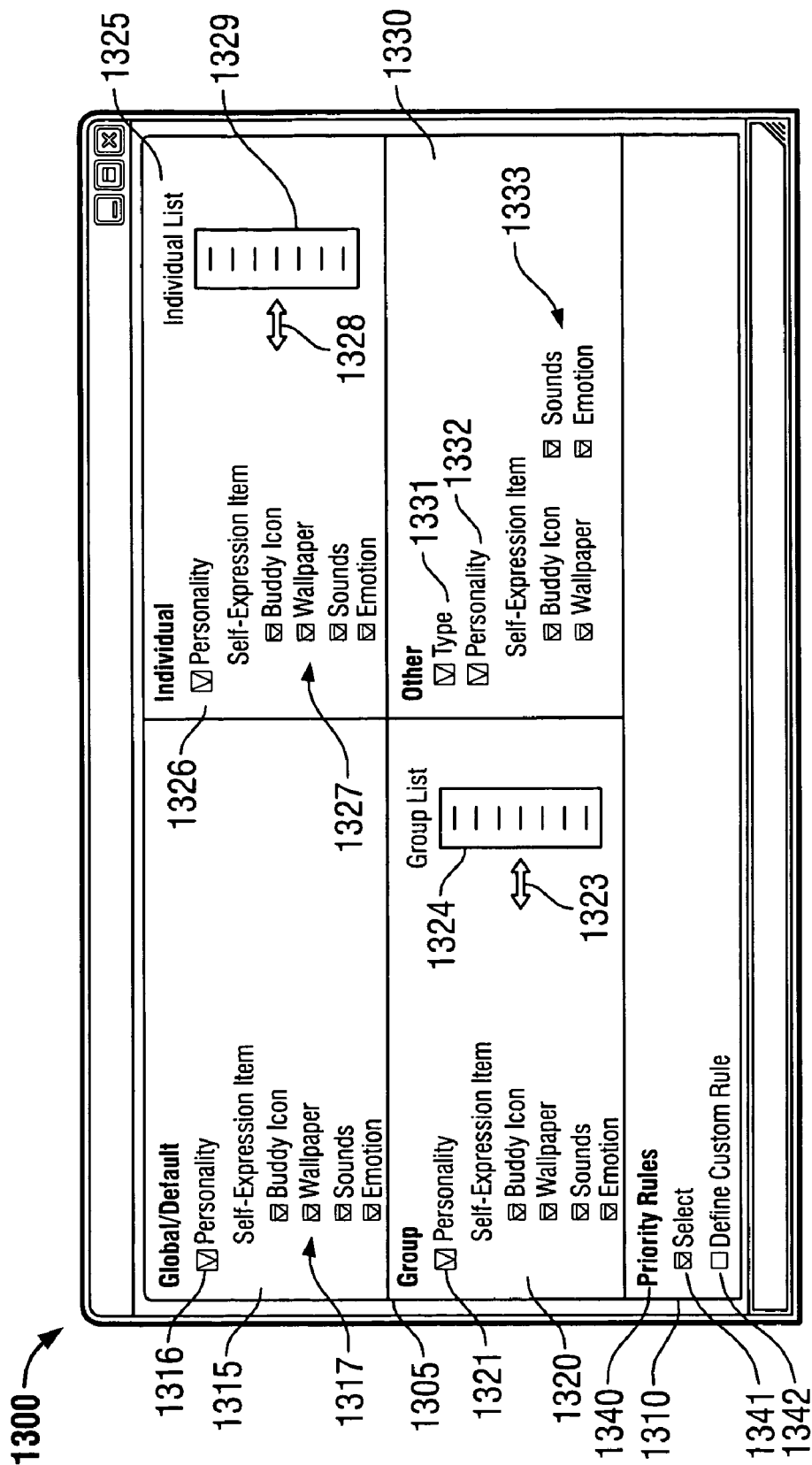

As shown in FIG. 13, a UI 1300 may be provided to enable the IM sender to assign a persona to be projected and to select rules for resolving conflicts among the personas to be projected. The UI 1300 includes as assignment portion 1305 and a priority rule portion 1310. The assignment portion 1305 includes controls to enable the IM sender to assign a persona as a global or default persona 1315, assign a persona to a group of potential IM recipients 1320, assign a persona to an individual IM recipient 1325, and assign a persona based upon other criteria 1330.

In particular, the global or default controls 1315 may include a drop down menu 1316 to enable the IM sender to select a default persona and may include one or more self-expression drop down menus 1317 to enable the IM sender to select one or more default personalization items to be projected. The group controls 1320 may include a drop down menu 1321 to enable the IM sender to select a persona to be projected to a group and may include one or more self-expression drop down menus 1322 to enable the IM sender to select one or more personalization items to be projected to a group. Association arrows 1323 and a Group list 1324 may be used to match the selected persona and/or self-expression items with a particular group. The individual controls 1325 may include a drop down menu 1326 to enable the IM sender to select a persona to be projected to an individual and may include one or more self-expression drop down menus 1327 to enable the IM sender to select one or more personalization items to be projected to an individual. Association arrows 1328 and a Group list 1329 may be used to match the selected persona and/or self-expression items with a particular individual. The other criteria controls 1330 may include a drop down menu 1331 to enable the IM sender to select a type of criteria or trigger, a drop down menu 1332 to enable the IM sender to select a persona to be projected based upon other criteria and may include one or more self-expression drop down menus 1333 to enable the IM sender to select one or more personalization items to be projected based on other criteria. The other criteria may include, for example, weather at the IM sender location, a day of the week, a time of day, a holiday, a calendar event, a week day or a weekend day. The priority rules portion 1310 includes priority rule controls 1340 to enable the IM sender to select priority rules to resolve conflicts between personas or self-expression items or functionality within personas. The controls 1340 may include a drop down menu 1341 to choose pre-defined sets of rules or a UI control 1342 to enable the user to define custom priority rules.

To set a personality for a buddy-group, the IM sender may use the interface to select the buddy group and assign the personality that will be presented to all IM recipients that belong to the selected buddy group. In other implementations, the IM sender may be able to use the interface to set a global personalization item and/or personality on a per-buddy basis. A global personalization item is typically implemented as a default personalization item sent to a buddy if no other type of personalization item (e.g., buddy icon, buddy wallpaper, buddy sound, or smiley) is set for the buddy on a group or an individual basis. A personalization item may be set for a particular group and used for members of the group, or may be set for an individual buddy and used for that buddy. Typically, an individual (personal) personalization item selection overrides a selection for a group personalization item, and a group personalization item selection overrides a selection for a global personalization item. Similarly, an individual (personal) personality selection overrides a selection for a group personality, and a group personality selection overrides a selection for a global personality.

In some implementations that allow for global personalization items, the group personalization item set for a buddy group optionally may be set by overriding the global personalization item with a new personalization item. For example, if the global buddy icon is set to a bear, and a buddy group personalization item for the "co-worker" group may be set to a beaver, the personalization item presented to IM recipients in the "co-worker" buddy group would be a beaver, while the personalization item presented to IM recipients in other groups would default to the global buddy icon, a bear. Similarly, in some implementations, an individual (personal) personalization item may be set by overriding a group personalization item or a global personalization item for particular IM recipients.

Next, an IM session between the IM sender and the IM recipient is initiated (step 520). The IM session may be initiated by either the IM sender or the IM recipient. An IM UI is rendered to the IM recipient, configured to project the personality assigned to the IM recipient by the IM sender (step 525), as illustrated, for example, by FIG. 8.

The appropriate personality/personalization item set for a buddy is sent to the buddy when the buddy communicates with the IM sender through the instant messaging client program. For example, in an implementation which supports global personalization items, group personalization items, and personal personalization items, a personal personalization item is sent to the buddy if set, otherwise a group personalization item is sent, if set. If neither a personal nor a group personalization item is set, then the global personalization item is sent. As another example, in an implementation that supports global personalization items and group personalization items, the group personalization item for the group to which the buddy belongs is sent, if set, otherwise the global personalization item is sent. In an implementation that only supports group personalization items, the group personalization item for the group to which the buddy belongs is sent to the buddy.

An IM session between the IM sender and another IM recipient also may be initiated (step 530) by either the IM sender or the second IM recipient.

Relative to the second IM session, a second IM UI is rendered to the second IM recipient, configured to project the personality assigned to the second IM recipient by the IM sender (step 535), as illustrated by FIG. 1 where the IM session are concurrently opened and again by FIG. 8 otherwise. The personality may be projected in a similar manner to that described above with respect to step 525. However, the personality projected to the second IM recipient may differ from the personality projected to the first IM recipient described above in step 525.

Figure 6:
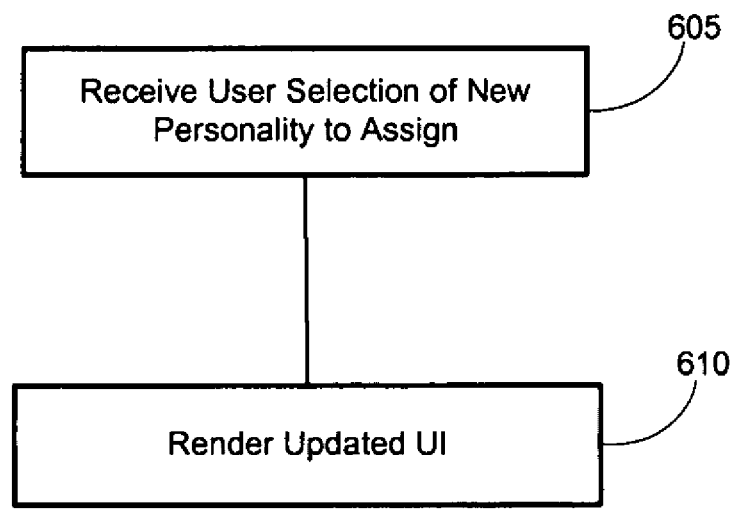

Referring to FIG. 6, an exemplary procedure 600 enables an IM sender to change a personality assigned to an IM recipient. In procedure 600, a user selection of a new personality to be assigned to the IM recipient is received (step 605). The change may be received through an IM chooser 1000, such as that discussed above with respect to FIG. 10, and may include choosing self-expression items and/or features and functionality using such as interface or may include "snagging" a personality of the buddy using such an interface. Snagging a personality refers to the appropriation by the IM sender of one or more personalization items used by the IM recipient. Typically, all personalization items in the personality of the IM recipient are appropriated by the IM sender when "snagging" a personality.

Next, the updated UI for that buddy is updated based on the newly selected personality (step 610).

Figure 14:
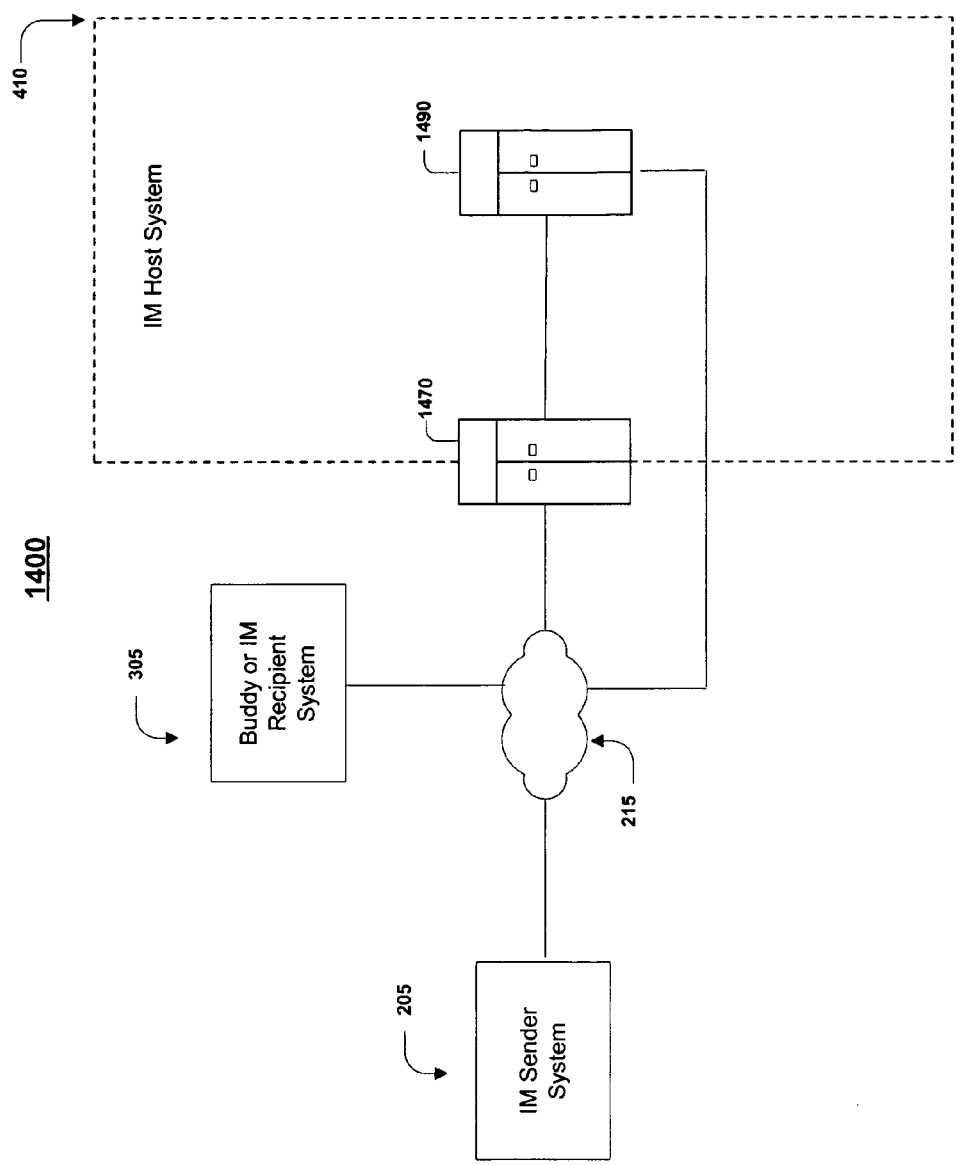

FIG. 14 illustrates a communications system 1400 including an IM sender system 205 communicating with an IM recipient system 405 and an IM host system 410 through a communication link 215. System 1400 illustrates a possible implementation of the communications system 400 of FIG. 4.

In system 1400, the IM host system 410 includes a login server 1470 for enabling access by IM senders and routing communications between the IM sender system 205 and other elements of the IM host system 410. The IM host system 410 also includes an IM server 1490. To enable access to and facilitate interactions with the IM host system 410, the IM sender system 205 and the IM recipient system 405 may include communication software, such as for example, an OSP client application and/or an IM client application.

As described with respect to FIG. 4, the IM host system 410 may support IM services irrespective of an IM sender's network or Internet access. Thus, the IM host system 410 may allow IM senders to send and receive IMs, regardless of whether they have access to any particular ISP. The IM host system 410 also may support associated services, such as administrative matters, advertising, directory services, chat, and interest groups related to the IM. The IM host system 410 has an architecture that enables the devices (e.g., servers) within the IM host system 410 to communicate with each other. To transfer data, the IM host system 410 employs one or more standard or exclusive IM protocols.

In one implementation, the IM sender system 205 establishes a connection to the login server 1470 in order to access the IM host system 410 and begin an IM session. The login server 1470 typically determines whether the particular IM sender is authorized to access the IM host system 410 by verifying the IM sender's identification and password. If the IM sender is authorized to access the IM host system 410, the login server 1470 usually employs a hashing technique on the IM sender's screen name to identify a particular IM server 1490 within the IM host system 410 for use during the IM sender's session. The login server 1470 provides the IM sender (e.g., IM sender system 205) with the IP address of the IM server 1490, gives the IM sender system 205 an encrypted key, and breaks the connection. The IM sender system 205 then uses the IP address to establish a connection to the particular IM server 1490 through the communications link 215, and obtains access to the IM server 1490 using the encrypted key. Typically, the IM sender system 205 will be able to establish an open TCP connection to the IM server 1490. The IM recipient system 405 establishes a connection to the IM host system 310 in a similar manner.

In one implementation, the IM sender system 205 may directly or indirectly transmit data to and access content from the IM server 1490 once a connection to the IM server 1490 has been established. By accessing the IM server, an IM sender can leverage the IM client application to determine whether particular IM senders ("buddies" or potential IM recipients) are online, exchange IMs with particular IM recipients, participate in group chat rooms, trade files such as pictures, invitations or documents, find other IM recipients with similar interests, get customized news and stock quotes, and search the Web. For example an IM sender who is using IM sender system 205 may view whether a buddy using IM recipient system 405 is online, and if so, may exchange IMs with that buddy. In one implementation, the IMs sent between IM sender system 205 and IM recipient system 405 are routed through IM host system 410. In another implementation, the IMs sent between IM sender system 205 and IM recipient system 405 are routed through a third party server (not shown) and, in some cases, are also routed through IM host system 410. In yet another implementation, the IMs are sent directly between IM sender system 205 and IM recipient system 405.

In one implementation, the IM host system 410 also includes a user profile server (not shown) connected to a database (not shown) for storing large amounts of user profile data. The user profile server may be used to enter, retrieve, edit, manipulate, or otherwise process user profile data. In one implementation, an IM sender's profile data includes, for example, the IM sender's screen name, buddy list, identified interests, and geographic location. The IM sender's profile data may also include self-expression items selected by the IM sender. The IM sender may enter, edit and/or delete profile data using an installed IM client application on the IM sender system 205 to interact with the user profile server.

Because the IM sender's data are stored in the IM host system 410, the IM sender does not have to reenter or update such information in the event that the IM sender accesses the IM host system 410 using a new or different IM sender system 205. Accordingly, when an IM sender accesses the IM host system 410, the IM server can instruct the user profile server to retrieve the IM sender's profile data from the database and to provide, for example, the IM sender's self-expression items and buddy list to the IM server. Alternatively, user profile data may be saved locally on the IM sender system 205.

Instant messaging programs typically allow IM senders to communicate in real-time with each other in a variety of ways. For example, many instant messaging programs allow IM senders to send text as an instant message, to transfer files, and to communicate by voice. Examples of IM communications exist over AIM (America Online Instant Messenger), AOL (America Online) Buddy List and Instant Messages, Yahoo Messenger, MSN Messenger, and ICQ, among others. Although discussed above primarily with respect to IM applications, other implementations are contemplated for providing similar functionality in platforms and online applications such as chat, e-mail, and streaming media applications.

Other implementations are within the scope of the following claims. For example, although the examples above are given in an instant message context, other communications systems with similar attributes may be used. For example, multiple personalities may be used in a chat room or in e-mail communications. Also, the user interface may be a viewable interface, an audible interface, a tactile interface, or a combination of these.

What is claimed is:

1. A computer implemented method comprising:
    using at least one processor to register a textual identifier with an online service provider to enable instant messaging communications sessions involving the single textual identifier;
    maintaining several different manifestations of the single textual identifier to be concurrently projected to other users;
    using at least one processor to project a first of the manifestations of the single textual identifier to a first of the other users; and
    using at least one processor to concurrently project a second of the manifestations of the single textual identifier to a second of the other users,
    wherein the manifestations comprise at least one of a displayable user icon, avatar, and graphical representation.

2. The method of claim 1 further comprising associating the first manifestation with a first group of other users so that the first manifestation is projected to members of the first group of other users in a communications session, wherein the first of the other users is included within the first group of other users.

3. The method of claim 2 further comprising associating the second manifestation with a second group of other users so that the second manifestation is projected to members of the second group of other users in a communications session, wherein the second of the other users is included within the second group of other users.

4. The method of claim 1 further comprising associating a manifestation with the first of the other users and associating a different manifestation with a group of the other users with which the first of the other users is associated, wherein the first manifestation projected to the first of the other users comprises an amalgamation of the manifestation associated with the first of the other users and the different manifestation associated with the group of the other users.

5. The method of claim 4 wherein the manifestation associated with the first of the other users overrides the different manifestation associated with the group of the other users to the extent a conflict exists.

6. The method of claim 1 further comprising associating a global manifestation with each of the other users and associating a different manifestation with a group of the other users with which the first of the other users is associated, wherein the first manifestation projected to the first of the other users comprises an amalgamation of the global manifestation associated with each of the other users and the different manifestation associated with the group of the other users.

7. The method of claim 6 wherein the global manifestation associated with each of the other users is overridden by the different manifestation associated with the group of the other users to the extent a conflict exists.

8. The method of claim 1 further comprising associating a global manifestation with each of the other users and associating a different manifestation with the first of the other users, wherein the first manifestation projected to the first of the other users comprises an amalgamation of the global manifestation associated with each of the other users and the different manifestation associated with the first of the other users.

9. The method of claim 8 wherein the global manifestation associated with each of the other users is overridden by the different manifestation associated with the first of the other users to the extent a conflict exists.

10. The method of claim 1 further comprising associating an individual manifestation with the first of the other users, associating a group manifestation with a group of the other users with which the first of the other users is associated, and associating a global manifestation with each of the other users, wherein the first manifestation projected to the first of the other users comprises an amalgamation of the individual manifestation associated with the first of the other users, the group manifestation associated with the group of the other users, and the global manifestation associated with each of the other users.

11. The method of claim 10 wherein the individual manifestation associated with the first of the other users overrides the group manifestation associated with the group of the other users and the group manifestation associated with the group of the other users overrides the global manifestation associated with each of the other users, to the extent a conflict exists.

12. The method of claim 1 wherein the communications session comprises an instant messaging communications session.

13. The method of claim 12 wherein the other users are members of a buddy list, the buddy list including the online presence state of the other users.

14. The method of claim 1, wherein the first manifestation comprises at least one of a buddy icon, a wallpaper, and an emoticon, and the second manifestation comprises at least one of a buddy icon, a wallpaper, and an emoticon.

15. The method of claim 1 further comprising selecting among the first and second manifestations for projection to a particular one of the other users based on an attribute of the particular other user.

16. The method of claim 1 further comprising receiving from the account a selection of at least the first and second manifestations.

17. The method of claim 1 further comprising selecting the first manifestation based upon an attribute of the first other user.

18. The method of claim 1 further comprising configuring the manifestation assigned to the first other user to change based upon the occurrence of a predetermined event.

19. The method of claim 18 wherein the predetermined event is based upon a time of day.

20. The method of claim 18 wherein the predetermined event is based upon a day of the week.

21. The method of claim 18 wherein the predetermined event is based the passage of a pre-determined interval of time.

22. The method of claim 18 wherein the predetermined event comprises a weather condition at a predetermined geographic location.

23. The method of claim 18 wherein the pre-determined event comprises communication of a predetermined word.

24. The method of claim 18 wherein the predetermined event comprises communication of a predetermined emoticon.

25. The method of claim 18 wherein the predetermined event comprises communication of a predetermined date.

26. The method of claim 18 wherein the predetermined event comprises communication of a predetermined number of instant messages from the first other user.

27. The method of claim 1 wherein the manifestation assigned to the first other user is configured to change at random among more than one selected manifestation.

28. The method of claim 1 wherein the textual identifier comprises a potential instant messaging sender, the first other user comprises a first potential instant messaging recipient, and the first manifestation is rendered to the first potential instant messaging recipient before communications are initiated by the potential instant messaging sender.

29. The method of claim 1 wherein the textual identifier comprises a potential instant messaging sender, the first other user comprises a first potential instant messaging recipient, and the first manifestation is rendered to the first potential instant messaging recipient after communications are initiated by the potential instant messaging sender.

30. A computer implemented method for enabling perception of multiple online manifestations in an instant messaging communications session, the method comprising:
using at least one processor to render, on an instant messaging recipient system, an instant messaging application user interface for an online service provider instant messaging communications session involving at least two potential instant messaging recipients and a single potential instant messaging sender;
using at least one processor to registering a textual identifier with the online service provider to represent the single potential communications sender;
receiving a first message that includes a first text message and a first manifestation to be displayed by a first potential instant messaging recipient when perceiving the first message, the first manifestation being selected by an instant messaging sender system from among multiple pre-defined manifestations for the single potential instant messaging sender, each manifestation comprising a collection of one or more self-expression items;
rendering the first manifestation at the instant messaging recipient system when rendering a portion of the first message;
receiving a second message that includes a second text message and a second manifestation to be displayed by a second potential instant messaging recipient when perceiving the second message, the second manifestation being selected by the instant messaging sender system from among multiple pre-defined manifestations for the single potential instant messaging sender and being at least partially distinguishable from the first manifestation, each manifestation comprising a collection of one or more self-expression items and the textual identifier; and
rendering the second manifestation at the instant messaging recipient system when rendering a portion of the second message.

31. The method of claim 30 wherein the first and second manifestations are rendered before communications are initiated by the potential instant messaging sender.

32. The method of claim 30 wherein the first and second manifestations are rendered after communications are initiated by the potential instant messaging sender.

33. The method of claim 30 in which self-expression items comprise one or more of a buddy icon, a wallpaper, and an emoticon.

34. The method of claim 30, wherein the first manifestation comprises at least one of a buddy icon, a wallpaper, and an emoticon, and the second manifestation comprises at least one of a buddy icon, a wallpaper, and an emoticon.

35. The method of claim 30 further comprising:
assigning the first manifestation to the first potential instant messaging recipient so that the first manifestation is thereafter automatically invoked and projected, in an online service provider instant messaging communications session involving the first potential instant messaging recipient; and
assigning the second manifestation to the second potential instant messaging recipient so that the second manifestation is thereafter automatically invoked and projected, in an online service provider instant messaging communications session involving the second potential instant messaging recipient.

36. The method of claim 30 further comprising:
assigning the first manifestation to a first group of potential instant messaging recipients so that the first manifestation is thereafter automatically invoked and projected in an online service provider instant messaging communications session involving a member of the first group of potential instant messaging recipients; and
assigning the second manifestation to a second potential instant messaging recipient so that the second manifestation is thereafter automatically invoked and projected, in an online service provider instant messaging communications session involving the second potential instant messaging recipient.

37. The method of claim 30 wherein a manifestation is selected for use in an online service provider instant messaging communications session with a potential instant messaging recipient according to a hierarchy of selection.

38. The method of claim 37 wherein selecting the manifestation according to a hierarchy of selection comprises:
first selecting a manifestation assigned to the potential instant messaging recipient if available;
next selecting a manifestation assigned to a group containing the potential instant messaging recipient, if available; and
next selecting a default manifestation, if available.

39. The method of claim 37 wherein selecting the manifestation according to a hierarch of selection comprises appending one or more self-expression items of a higher-ranked manifestation to self-expression items of a lower-ranked manifestation.

40. The method of claim 37 wherein selecting the manifestation according to a hierarch of selection comprises replacing one or more self-expression items of a lower-ranked manifestation with self-expression items of a higher-ranked manifestation.

41. The method of claim 30 further comprising locking a manifestation to a potential instant messaging recipient so as to guard against unintended manifestation switching.

42. The method of claim 30 further comprising forbidding a manifestation to be assigned to a potential instant messaging recipient so as to guard against unintended manifestation switching.

43. The method of claim 30 further comprising changing a manifestation assigned a potential instant messaging recipient while conversing with the potential instant messaging recipient in an instant messaging communications session.

44. The method of claim 30 further comprising receiving a manifestation associated with a potential instant messaging recipient and saving the received manifestation.

45. The method of claim 30 wherein a manifestation is provided by a third party.

46. The method of claim 30 wherein a manifestation assigned to a potential instant messaging recipient is configured to change upon the occurrence of a predetermined event.

47. The method of claim 46 wherein the predetermined event comprises the passage of a pre-determined interval of time.

48. The method of claim 46 wherein the predetermined event comprises the passage of a pre-determined time of day.

49. The method of claim 46 wherein the predetermined event comprises a weather condition at a predetermined geographic location.

50. The method of claim 46 wherein the pre-determined event comprises a day of the week.

51. The method of claim 46 wherein the predetermined event comprises communication of a predetermined word.

52. The method of claim 46 wherein the predetermined event comprises communication of a predetermined emoticon.

53. The method of claim 46 wherein the predetermined event comprises communication of a predetermined date.

54. The method of claim 46 wherein the predetermined event comprises communication of a predetermined number of instant messages from the potential instant messaging recipient.

55. The method of claim 30 wherein a manifestation assigned to a potential instant messaging recipient is configured to change at random among more than one selected manifestations.

56. A computer implemented method for enabling perception of multiple manifestations in a communications session, the method comprising:

using at least one processor to rendering, on a communications recipient system, a communications application user interface for an online service provider communications session involving at least two potential communications recipients and a single potential communications sender;

using at least one processor to registering a textual identifier with the online service provider to represent the single potential communications sender;

receiving a first message that includes a first text message and a first manifestation to be displayed by a first potential communications recipient when perceiving the first message, the first manifestation being selected by a communications sender system from among multiple pre-defined manifestations for the single potential communications sender, each manifestation comprising a collection of one or more self-expression items;

rendering the first manifestation at the communications recipient system when rendering a portion of the first message;

receiving a second message that includes a second text message and a second manifestation to be displayed by a second potential communications recipient when perceiving the second message, the second manifestation being selected by the communications sender system from among multiple pre-defined manifestations for the single potential communications sender and being at least partially distinguishable from the first manifestation, each manifestation comprising a collection of one or more self-expression items and the textual identifier; and rendering the second manifestation at the communications recipient system when rendering a portion of the second message.

* * * * *